United States Patent [19]

Iwase et al.

[11] Patent Number: 5,327,125
[45] Date of Patent: Jul. 5, 1994

[54] APPARATUS FOR AND METHOD OF CONVERTING A SAMPLING FREQUENCY ACCORDING TO A DATA DRIVEN TYPE PROCESSING

[75] Inventors: Toshihiro Iwase, Nara; Hiroshi Kanekura, Yamatokouriyama, both of Japan

[73] Assignee: Sharp Kabushiki Kaisha, Osaka, Japan

[21] Appl. No.: 91,831

[22] Filed: Jul. 13, 1993

[30] Foreign Application Priority Data

Jul. 13, 1992 [JP] Japan .................... 4-184902

[51] Int. Cl.$^5$ .......................... H03M 7/00; H04N 9/04
[52] U.S. Cl. ........................ 341/61; 348/424; 348/441
[58] Field of Search ............. 341/61, 50; 358/41, 358/11

[56] References Cited

U.S. PATENT DOCUMENTS 4,630,034 12/1986 Takahashi .................. 341/61 X

FOREIGN PATENT DOCUMENTS 1105611 4/1989 Japan .
4170106 6/1992 Japan .

Primary Examiner—Sharon D. Logan

[57] ABSTRACT

A sampling frequency converting apparatus includes an input port converting an input image data (X) into a data packet, a data driven engine executing interpolation on the data packet applied from the input port for performing sampling frequency conversion in which an operation is performed in accordance with a predetermined data flow program, an output port outputting the data packet produced by the data driven engine at a second sampling frequency, and an image memory for data processing. The sampling frequency converting apparatus can easily accommodate change of specification of the sampling frequency, and can be easily produced without requiring complicated timing control.

14 Claims, 15 Drawing Sheets

① DATA OF 1ST FIELD

①' DATA BY INTERPOLATION OF DATA OF 1ST FIELD (INTRAFIELD INTERPOLATION)

① 1ST FIELD

③ 3RD FIELD (INTERFRAME INTERPOLATION)

(INTERFIELD INTERPOLATION)

32.4MHz 48.6MHz $Y_1 = \alpha_4 \cdot X_1 + \alpha_1 \cdot X_2 + \alpha_3 \cdot X_3 + \alpha_5 \cdot X_4$
$Y_2 = \alpha_6 \cdot X_1 + \alpha_3 \cdot X_2 + \alpha_0 \cdot X_3 + \alpha_3 \cdot X_4 + \alpha_6 \cdot X_5$
$Y_3 = \alpha_5 \cdot X_2 + \alpha_2 \cdot X_3 + \alpha_1 \cdot X_4 + \alpha_4 \cdot X_5$

APPARATUS FOR AND METHOD OF CONVERTING A SAMPLING FREQUENCY ACCORDING TO A DATA DRIVEN TYPE PROCESSING

BACKGROUND OF THE INVENTION

1. Field of the Invention

The present invention relates to an apparatus for converting a sampling frequency of a digital signal, and in particular, to an apparatus for carrying out sampling frequency conversion required in a decoding operation of a MUSE signal.

2. Description of the Related Art

In order to carry out various processings on information signals at a high speed and with a high precision, the information signals are generally converted into digital signals for processings. Image signals transmitting a large amount of information are also subjected to such conversion. The image signals are essentially analog signals, and thus are sampled at a certain sampling frequency for conversion into digital signals. As one type of information signal to be digitally processed, there is an image signal referred to as MUSE (multiple sub-Nyquist subsampling subencoding) signal. The MUSE signal is used in high definition television broadcast. The high definition television signal is transmitted through a communication satellite. One channel has a bandwidth of 27 MHz. A base band signal band width must be band-compressed into about 8 MHz. The signal thus band-compressed is referred to as MUSE signal.

FIGS. 11A-11E show a manner of band-compressing a luminance signal in the MUSE system. The MUSE system will be described below with reference to FIGS. 11A-11E. In FIG. 11A, an original image signal is sampled at a sampling frequency of 48.6 MHz and is converted into a digital signal. Thereafter, processings such as γ-correction and matrix processing are carried out to generate a luminance signal Y. The luminance signal Y is sampled at a sampling frequency of 48.6 MHz. In FIG. 11A, a curve I indicates a relative value of spectrum strength.

In FIG. 11B, interfield offset sampling is performed on the luminance signal sampled at the sampling frequency of 48.6 MHz. The sampling frequency is 24.3 MHz. In this interfield offset sampling operation, the sampling is started at different timings every fields. As a result, high frequency component of the input signal is folded at the frequency of 12.15 MHz, as indicated by curve II in FIG. 11B.

Referring to FIG. 11C, after a low-pass filter removes a frequency component of 12.15 MHz or more, data is interpolated, and the sampling frequency is restored into 48.6 MHz.

Referring to FIG. 11D, the sampling frequency is converted from 48.6 MHz to 32.4 MHz.

In FIG. 11E, interframe offset sampling is carried out. In the interframe offset sampling, image data is subsampled while offsetting the position in each frame by one pixel position. Due to the interframe offset sampling, the sampling frequency goes to 16.2 MHz. The interframe offset sampling reduces the amount of data into ½ of that at the sampling frequency of 32.4 MHz.

Due to this interframe offset sampling, the high frequency band component of 8.1 MHz or more of the original signal is entirely contained as a folded component in the band lower than 8.1 MHz. In FIG. 11E, curve III indicates the interframe folded component. Curve II indicates the interfield folded component. The luminance signal of the sampling frequency of 16.2 MHz obtained by this interframe offset sample is multiplexed with a line sequential chrominance signal, which in turn has been processed in a similar manner, and is transmitted as an analog signal.

A principle of MUSE system can be summarized as follows. After conversion of a base band signal into a digital signal, subsampling of sampling points are uniformly performed. One sample is extracted from every four samples of image data for one picture (frame) to form one field. In this processing, the sampling positions are offset by one sample every fields (offset sampling). The positions of pixels are the same in every four fields.

FIG. 12 shows a sampling pattern of an image signal. In each scanning line, field numbers are superposed on pixel positions.

In a recovering operation, an image of one frame is produced from four fields. No problem is caused when a picture is still. This cannot be applied for a moving picture. Therefore, in the MUSE decoder for recovering MUSE signal, the signal processing is carried out in different manners for a motion area including a moving object and a still area not including a moving object.

More specifically, as shown in FIG. 12, the picture in the still area is recovered using the entire data of four fields (one frame) (entire data of first to fourth fields in FIG. 12). For this recovery, it is necessary to interpolate the data by precisely executing signal processing in a manner opposite to that of the interframe offset sampling and interfield offset sampling. If such processing were not executed, the folded component would appear as interference in the picture.

The picture in the motion area is recovered based on data of one field (e.g., data of only 1st field in FIG. 12). The horizontal resolution is approximately a half of that of the still area. In a visually displayed picture, edges blurs. The reason why the MUSE system employs this processing manner for the motion area is based on evaluation of perception that resolution of human eyes to a moving object is low.

FIG. 13 schematically shows a whole structure of a MUSE decoder. The MUSE decoder recovers image signals from band-compressed MUSE signals. In the MUSE decoder, the band-compressed MUSE signals are processed in different manners for the still and motion areas. For the still area, the signal is decoded from data of four fields by two processings, i.e., interframe interpolation and interfield interpolation. For the motion area, the signal is decoded from data of one field by interpolation.

In FIG. 13, the MUSE decoder includes a low-pass filter (LPF) 502 for band-limiting the MUSE signal, an A/D converter 504 for converting the output of low-pass filter 502 into a digital signal, and a non-linear processing circuit 506 for non-linearly processing the digital signal supplied from the A/D converter 504. The low-pass filter 502 has a cutoff frequency of 8.2 MHz, and passes the MUSE signal of a band of 8.1 MHz. The A/D converter 504 samples the analog signal sent from the low-pass filter 502 at the sampling frequency of 16.2 MHz and converts the same into the digital signal. The non-linear processing circuit 506 carries out processes such as reverse γ correction and waveform equalizing process.

The MUSE decoder further includes an intrafield interpolating circuit 512 which receives the output of non-linear processing circuit 506 and performs intrafield interpolation, a motion area detecting circuit 508 which receives the output of non-linear processing circuit 506 and detects the motion area, an interframe interpolating circuit 510 which receives the output of non-linear processing circuit 506 and performs interframe interpolation, a sampling frequency converting circuit 514 which converts the sampling frequency of output of intrafield interpolating circuit 512, a sampling frequency converting circuit 518 which receives the output of interframe interpolating circuit 510 and converts the sampling frequency, and an interfield interpolating circuit 520 which receives the output of sampling frequency converting circuit 518 and performs interfield interpolation.

The interframe interpolating circuit 510, sampling frequency converting circuit 518 and interfield interpolating circuit 520 form a path for processing the signal for still area. The intrafield interpolating circuit 512 and sampling frequency converting circuit 514 form a path for processing the signal for motion area. Both the sampling frequency converting circuits 514 and 518 convert the sampling frequency of luminance signal from 32.4 MHz to 48.6 MHz, and convert the sampling frequency of chrominance signal from 32.4 MHz to 64.8 MHz. The motion area detecting circuit 508 detects a high band component (corresponding to a state of rapid motion) viewed on a time frequency base. The MUSE system performs the interframe offset sampling. In order to detect the motion area, therefore, differences of sampling values between the frames containing the same sampling points, i.e., between the second and fourth frames and between the first and third frames are obtained, respectively, and a difference between both the differences is combined. Thereby, the motion area for each frame can be detected. More specifically, a difference between the supplied MUSE signal and the signal delayed by two frames is obtained. The absolute value thereof is obtained, and is compared with the absolute value signal delayed by one frame to obtain a larger value, i.e., the maximum value to be output. This maximum value forms the motion area detecting signal.

The MUSE decoder further includes a multiplier circuit 516 which performs multiplication of the output of sampling frequency converting circuit 514 and the motion area detecting signal sent from the motion area detecting circuit 508, an inverter circuit 522 inverting the motion area detecting signal sent from the motion area detecting circuit 508, a multiplier circuit 524 for multiplying the output of interfield interpolating circuit 520 by the output of inverter circuit 522, an adder circuit 525 for performing addition of the multiplier circuits 516 and 524 for mixing the motion and still areas, a TCI decoder 526 performing a TCI decoding operation on the output of adder circuit 525, and an analog processing circuit 528 which performs required processing for producing R, G and B signals after converting the output of TCI decoder 526 into an analog signal.

The TCI decoder 526 converts the line sequential chrominance signals (in which (R-Y) signals and (B-Y) signals alternately appears) into signals appearing on respective original lines. The TCI decoder 526 also performs time-base correction by time-expanding the time-base compressed chrominance signal and luminance signal. The analog processing circuit 528 converts the output sent from the TCI decoder 526 into an analog signal, and then performs an inverse matrix operation to produce R, G and B signals. Then, brief descriptions will be successively made on operations for the intrafield interpolation, conversion of sampling frequency, interframe interpolation and interfield interpolation.

FIG. 14 shows distribution of sampling points when the intrafield sampling is performed. Distribution of the sampling data shown in FIG. 14 is given by the output of intrafield interpolating circuit 512 shown in FIG. 13. "Interpolation" is an operation by which data at points not sampled are approximately produced from data at sampled points. The intrafield interpolating circuit 512 corrects or interpolates data in the field based on the supplied data. More specifically, as shown in FIG. 14, data (indicated by "1" in FIG. 14) of the first field is processed in a certain manner to form interpolated data indicated by "1'" in FIG. 14. The sampling frequency of output of intrafield interpolating circuit equals 32.4 MHz. This equals an operation opposite to that shown in FIG. 11D.

FIG. 15 shows an output sample pattern of the interframe interpolating circuit 510. The interframe interpolation is a processing performed on an image in the still area. Image data which precedes by two fields is interpolated. Image data which precedes by one frame may be employed. Since the interframe offset sampling is carried out, the image data preceding by one frame exists at a position intermediate the sampling points of current frame. Owing to the interframe interpolation, image data of the sampling frequency of 32.4 MHz is obtained from the sample data of sampling frequency of 16.2 MHz.

Then, the image data of which sampling frequency was converted into 32.4 MHz by the intrafield interpolating circuit 512 and interframe interpolating circuit 510 is converted into the image data of sampling frequency of 48.6 MHz. The purpose of the conversion of sampling frequency is to perform the intrafield interpolation, and the reason thereof is that the original image data was sampled at the sampling frequency of 48.6 MHz.

FIG. 16 shows distribution of output sample data of the interfield interpolating circuit 520. The interfield interpolating circuit 520 interpolates image data of line of a preceding field for every one field. Since the sampling positions in the respective fields are different from each other, the image data of the preceding field is interpolated in the position in which the image data is not present. Thereby, image corresponding to the original still area can be obtained. Using the motion area detecting signal sent from the motion area detecting circuit 508, one of the output of intrafield interpolating circuit 512 and the output of interfield interpolating circuit 520 is selected to obtain image data corresponding to the motion area and still area.

The sampling frequency of 16.2 MHz can be converted relatively easily into the sampling frequency of 32.4 MHz. This can be achieved merely by the "interpolation" processing. For the conversion of sampling frequency of 32.4 MHz into the image data of sampling frequency of 48.6 MHz, two image data must correspond to three image data.

Specifically, as shown in FIG. 17, owing to 32.4 MHz:48.6 MHz=2:3, two image data P1 and P2 at the sampling frequency of 32.4 MHz correspond to three image data Q1, Q2 and Q3 at the sampling frequency of 48.6 MHz. A structure for performing this frequency conversion will be described below.

FIG. 18 shows a structure of a sampling frequency converting circuit in the prior art. In FIG. 18, the sampling frequency converting circuit includes a two-phase parallel converting circuit 600 which successively receives input data train and supplies in parallel the data train in odd places (odd generation data train) and the data train in even places (even generation data train), a table processing circuit 610 which receives parallel outputs from the two-phase parallel converting circuit 600 and performs a predetermined arithmetic operation for outputting the result, a parallel processing circuit 620 which receives the output of table processing circuit 610 and performs a predetermined arithmetic operation on the same for outputting in parallel three kinds of data, and a switching circuit 630 which successively and selectively passes the outputs of parallel processing circuit 620 in a predetermined order.

The two-phase parallel converting circuit 600 includes a D-type flip-flop 602 strobing, latching and outputting the data, which is supplied to an input D in synchronization with a clock signal $\phi 1$ applied to a clock input CK, a D-type flip-flop 604 which strobes, latches and outputs the output of D-type flip-flop 602 received at its input D in response to a clock signal $\phi 2$ applied to the clock input CK, and a D-type flip-flop 606 which strobes, latches and outputs data applied to the input D in response to the clock signal $\phi 2$ applied to the clock input CK. The clock signal $\phi 1$ has a frequency of 32.4 MHz, and the clock signal $\phi 2$ has a frequency of 16.2 MHz.

The table processing circuit 610 includes two table ROMs (read-only memories) 612 and 614 which have stored results of multiplication and outputs the results of multiplication of input data by predetermined coefficients using applied data as address signals, respectively. The table ROM 612 receives the output of D-type flip-flop 604 as an address signal, and outputs in parallel the results of multiplication of this data by coefficients $\alpha 1$, $\alpha 3$ and $\alpha 5$. The table ROM 614 receives the output of D-type flip-flop 606 as an address, and outputs in parallel the results of multiplication of this data by coefficients $\alpha 0$, $\alpha 2$, $\alpha 4$ and $\alpha 6$.

The parallel processing circuit 620 includes a timing control circuit 622 which receives in parallel the output data from the table processing circuit 610 and controls or adjusts the timing for performing a predetermined operation, and an processing circuit 624 which performs a predetermined operation on the data controlled by the timing control circuit 622. The timing control circuit 622 includes a delay circuit and others, and controls a transmission time of the input data so as to transmit data combined in a predetermined manner to the processing circuit. The processing circuit 624 performs a predetermined operation on the applied data, of which content will be described later, and outputs three kinds of data in parallel.

The switching circuit 630 includes a 3-input and 1-output switching circuit, which receives the outputs of parallel processing circuit 620 in parallel and sequentially switches its inputs in accordance with a clock signal $\phi 3$ for outputting. The clock signal $\phi 3$ has a frequency of 48.6 MHz. Then, an operation of this sampling frequency converting circuit shown in FIG. 18 will be described below also with reference to FIG. 19. FIGS. 19A-19E show patterns of sampling data at portions A, B, C, D and E in the sampling frequency converting circuit shown in FIG. 18.

A shown in FIG. 19A, the two-phase converting circuit 600 sequentially receives a data train X1, X2, ... sampled at the sampling frequency of 32.4 MHz. The D-type flip-flop 602 latches and output this input data in response to the clock signal $\phi 1$. The D-type flip-flop 602 serves as a delay circuit which delays the applied data by one clock cycle of the clock signal $\phi 1$ and outputting the same. Therefore, the D-type flip-flop 604 receives input data Xj (where j is a natural number) which is delayed by one clock with respect to data received by the D-type flip-flop 606.

Each of the D-type flip-flops 604 and 606 latches the applied data in accordance with the clock signal $\phi 2$ of frequency of 16.2 MHz and outputting the same. Therefore, the output of each of the D-type flip-flops 604 and 606 equals sampling data formed by alternately subsampling the input data. Data delayed by one clock cycle is transmitted to the D-type flip-flop 604. Therefore, the D-type flip-flop 604 outputs the even-generation data train formed of data X2$i$ bearing even numbers. The D-type flip-flop 606 outputs the data train of odd-generation data X2$i$+1 bearing odd numbers. Since the odd-generation data X2$i$+1 and even-generation data X2$i$ are output in response to the clock signal $\phi 2$, they are output at the same timing.

The table processing circuit 610 outputs in parallel the results of multiplication of the odd-generation data X2$i$ by the coefficients $\alpha 1$, $\alpha 3$ and $\alpha 5$, and also outputs in parallel the results of multiplication of the even-generation data X2$i$+1 by the coefficients of $\alpha 0$, $\alpha 2$, $\alpha 4$ and $\alpha 6$. The table processing circuit 610 outputs the sampling data train at the sampling frequency of 16.2 MHz.

The parallel processing circuit 620 performs a predetermined operation on the applied data, and outputs in parallel three data Y3$i$, Y3$i$+1 and Y3$i$+2 (where i is an integer such as 0, 1, ...). More specifically, the processing circuit 624 outputs data Y1, Y2 and Y3 obtained from the data X1, X2, ... X5 produced by the timing control circuit 622 in accordance with the following formulas (1).

$$Y1 = \alpha 4 \cdot X1 + \alpha 1 \cdot X2 + \alpha 3 \cdot X3 + \alpha 5 \cdot X4$$

$$Y2 = \alpha 6 \cdot X1 + \alpha 3 \cdot X2 + \alpha 0 \cdot X3 + \alpha 3 \cdot X4 + \alpha 6 \cdot X5$$

$$Y3 = \alpha 5 \cdot X2 + \alpha 2 \cdot X3 + \alpha 1 \cdot X4 + \alpha 4 \cdot X5 \quad (1)$$

The parallel processing circuit 620 outputs the data at the sampling frequency of 16.2 MHz.

The switching circuit 630 successively outputs the data Y3$i$, Y3+1 and Y3$i$+2 supplied from the parallel processing circuit 620 in response to the clock signal $\phi 3$. Thereby, the switching circuit 630 outputs the sampling data train Y1, Y2, Y3, ... having the sampling frequency of 48.6 MHz.

As described above, three data Y3$i$, Y3$i$+1 and Y3$i$+2 are produced using the two data, i.e., odd-generation data X2$i$ and even-generation data X2$i$+1, so that the sampling frequency is increased 3/2 times.

Conversion of the sampling frequency of digital signal conventionally requires dedicated sampling frequency converter formed of a digital circuit which has a required processing function. If the dedicated sampling frequency converter is to be used, it is necessary to prepare a table processing circuit, to control input/output timings of data between any circuits and to optimize structures of timing control circuit and processing circuit for simplifying a structure of parallel processing circuit. Although the sampling frequency converter formed of the dedicated circuit has an advantage that the intended function can be ensured, it disadvantageously requires a long time for designing the same.

Also, in order to change a specification of frequency conversion, i.e., contents of calculation (values of coefficients $\alpha 0-\alpha 6$ and contents of operation performed by the parallel processing circuit), it is necessary to utilize another dedicated digital circuits which are designed for the respective circuit portions. Therefore, the sampling frequency converter formed of the dedicated circuits cannot flexibly accommodate the change of specification.

In the MUSE decoders of which specification has been generally decided, particular change of its structure is not required for a purpose other than improvement of its circuitry after an optimized sampling frequency converter is once obtained. However, apparatuses referred to as simple type MUSE decoders are currently used. The simple type MUSE decoder performs the decoding of which processing contents are simplified in order to receive and recover high definition television signals by an inexpensive receiver. For this purpose, it is necessary to change the contents of operation required for the conversion of sampling frequency in accordance with the contents of simplified decoding processing. In the case where the sampling frequency converter formed of dedicated digital circuits is used, therefore, new design of circuits is required, and thus the change of specification (contents of operation) cannot be flexibly accommodate.

Also, a similar problem is generally caused in fields, other than the MUSE decoder, in which band-compressed signals are interpolated to recover original signals, because conversion of sampling frequencies is required in such fields.

SUMMARY OF THE INVENTION

It is an object of the invention to provide a sampling frequency converting apparatus which can easily achieve conversion of a sampling frequency.

Another object of the invention is to provide a sampling frequency converting apparatus which can flexibly accommodate change of specification.

In brief, a sampling frequency converting apparatus according to the invention uses a data flow type information processing apparatus (data driven type processor) and utilizes a high-speed parallel processing function for converting a sampling frequency.

Specifically, a sampling frequency converting apparatus according to the invention includes an input producing circuit for receiving digital signals sampled at a first sampling frequency and assigning generation numbers and node numbers indicative of predetermined destinations to the same in an order of reception for producing input data packets, a writing circuit for writing the input data packets into a memory using the generation numbers related thereto as address signals, a reading circuit for receiving the input data packets and reading from the memory a predetermined set of the input data packets in accordance with instructions allocated to the related node numbers, and a processing circuit for performing an operation in accordance with the data packets read by the reading circuit.

The processing circuit executes the processing in accordance with the node numbers contained in the read data packets. During execution of this processing, the operation is performed on the data packets read in accordance with the instructions allocated to the node numbers. As a result of this processing, the processing circuit produces data packets corresponding to each input data packet such that a ratio between an input rate of the input data packets and a production rate of the data packets produced by the processing circuit is determined by a ratio between the first sampling frequency and the second sampling frequency.

The processing circuit executes the processing in accordance with the data packets read by the reading circuit. The operation is executed upon collection of necessary data. Therefore, it is not necessary to perform timing control for producing a set of required data, which is required by a dedicated digital circuit or the like, and the operation for the frequency conversion can be performed easily and surely. Contents of operations required for the frequency conversion are allocated to the respective nodes, so that the apparatus can easily accommodate change of the specification for converting the frequency by changing the operations allocated to the nodes.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
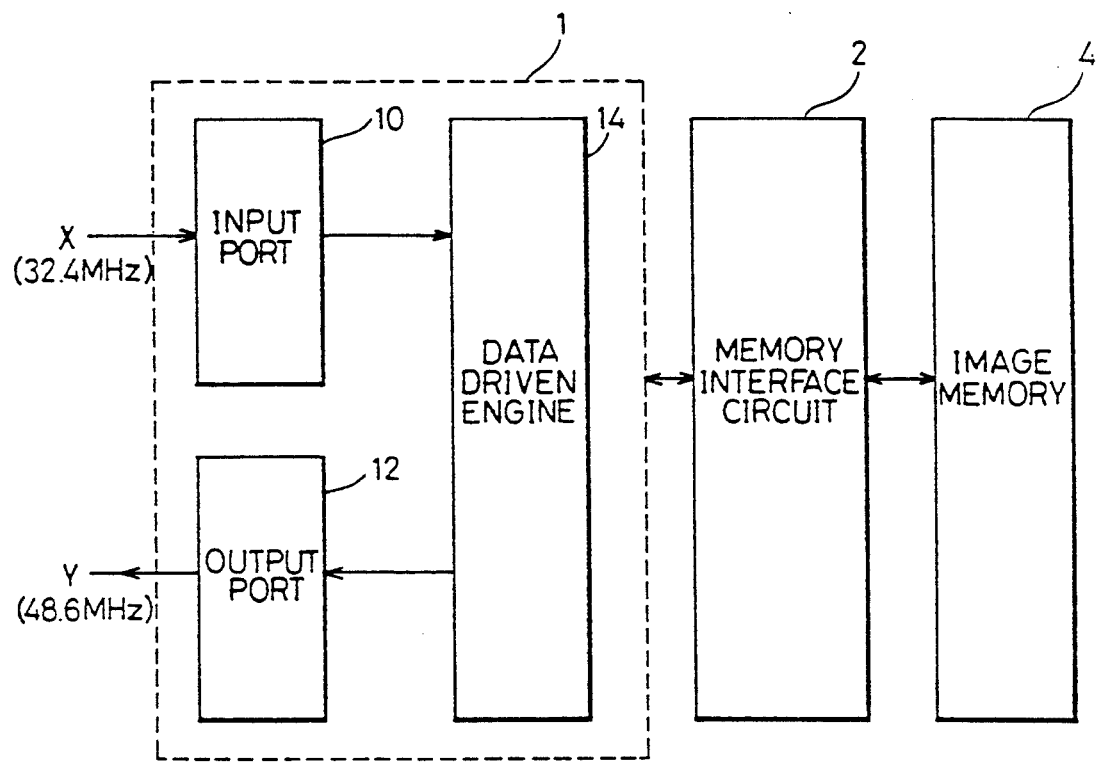
FIG. 1 schematically shows a whole structure of a sampling frequency converting apparatus of an embodiment of the invention.

FIG. 1 schematically shows a whole structure of a sampling frequency converting apparatus according to an embodiment of the invention. Referring to FIG. 1, the sampling frequency converting apparatus includes a data driven type information processing apparatus 1, which receives input data X having a sampling frequency of 32.4 MHz and performs a predetermined frequency converting processing thereon to produce digital output data Y having the sampling frequency of 48.6 MHz, an image memory 4 storing the data, and a memory interface circuit 2 which controls transmission of data between the data driven type information processing apparatus and image memory 4.

The data driven type information processing apparatus 1 includes an input port 10, which assigns generation numbers to the received input data X in accordance with an order of input and also assigns destination information thereto for producing data packets, a data driven engine 14 which performs a predetermined processing in accordance with the data packets produced by the input port 10, and an output port 12 which supplies output data sent from the data driven engine 14 in a form of data packets. Series of data Y having the converted sampling frequency of 48.6 MHz are obtained from the output port 12.

The data driven type information processing apparatus executes the processing according to a data flow program. The data flow program is described in a form of a directional graph consisting of nodes (referred to as actors) indicative of operation and control and arcs extending between the nodes.

Figure 2:
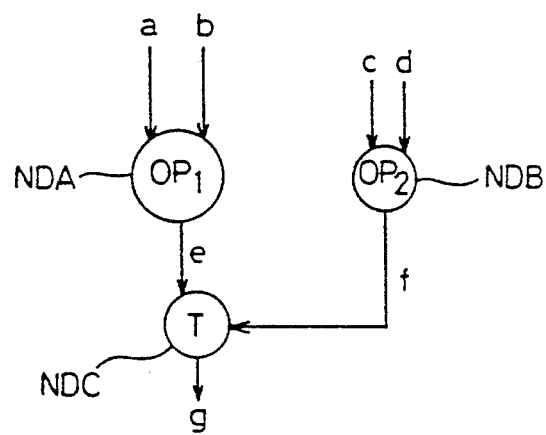
FIG. 2 illustrates a principle of operation of a data driven type information processing apparatus shown in FIG. 1.

FIG. 2 shows an example of the data flow program (data flow graph). In FIG. 2, a node NDA performs an operation OP1 on data applied to input arcs a and b and transmits the result of operation onto an output arc c. A node NDB, which has input arcs c and d, performs an operation OP2 on input data which are prepared on these arcs, and supplies the result of operation onto an output arc f. A node NDC transmits the data on the input arc e onto an output arc g when a signal on the control arc f is "true". In each node, the operation allocated to the node is executed upon preparation or completion of data (referred to as "tokens") on the input arcs. Execution of the operation is referred to as "firing" of node. As a result of firing, the input data (input tokens) are consumed to produce an output token.

For example, the node NDA is fired when the input data arrive at the two input arcs a and b and the output arc e is empty. In this state, the nodes NDA and NDB can be fired simultaneously if the input data arrive at the input arcs c and d. The node NDC must wait completion of operations of the nodes NDA and NDB. The node NDC can be fired after the completion of operations of the nodes NDA and NDB.

In general, a node having n inputs and m outputs can be achieved by combination of basic nodes each having two or less input(s) and two or less output(s). The basic node may be an operation node performing an operation on the data applied to input arcs, a distribution node copying the input token and sending the same to a plurality of output arcs, a junction node transmitting data applied to the plurality of input arcs to an output arc, and a control node controlling a path for transmitting data.

In the processing of the data flow type, the processing is executed on the basis of an execution principle referred to as data drive. In the principle of data drive, "all operations are executed upon collection of operands (data) required for the execution". The data driven method includes a static data driven method which allows only one set of input data for a certain processing, and a dynamic data driven method which allows two or more sets of input data. In the dynamic data driven method, identification data (ID) referred to as "generation number" is utilized for identifying a plurality of input data sets. The transmission data includes information for specifying the destination node and is transmitted in the form of a packet, as described above.

In this embodiment, the sampling frequency of digital signal is converted according to a program of a data flow graph type formed in accordance with contents of the operation. The data driven engine 14 includes a program memory storing a program described in the data flow form.

The image memory 4 stores the MUSE signal in the form of a data packet, and is utilized as a working area of the data driven type information processing apparatus. The memory interface circuit 2 controls the transmission of data between the data driven type information processing apparatus and image memory 4. The control of data transmission is generally executed in accordance with delivery and reception of request signals and acknowledge signals. In FIG. 1, the memory interface circuit 2 is shown transmitting data to and from the data driven engine 14. The memory interface circuit 2 transmits the data from and to the input and output ports 10 and 12. The image memory 4 allows reading and writing of data from and into the same. Generally, the image memory 4 is provided with a RAM port allowing random access and a SAM port allowing only serial access. The RAM port and SAM port can be individually accessed. A specific structure of the data driven type information processing apparatus 1 will be described below.

Figure 3:
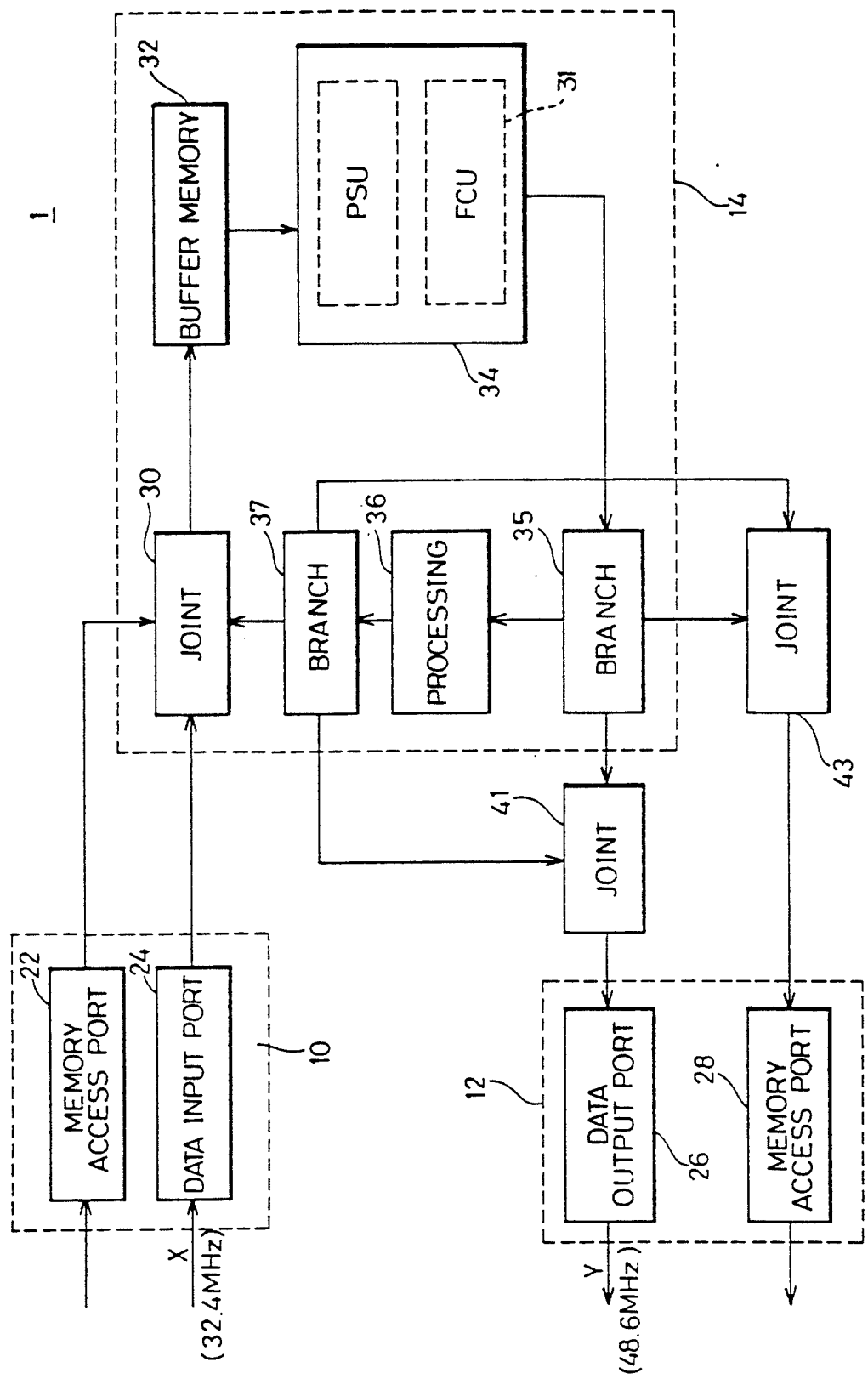
FIG. 3 shows a specific structure of the data driven type information processing apparatus shown in FIG. 1.

FIG. 3 is a block diagram schematically showing a whole structure of the data driven type information processing apparatus shown in FIG. 1. In FIG. 3, the input port 10 receives the data packets or image data read from the image memory 4, and performs necessary processings such as word conversion and packet producing before transmitting the same to the data driven engine 14. The data applied to the memory access port 22 is in a form of a data packet, and the word conversion thereof is not so important particularly in this embodiment.

The output port 12 includes a data output port 26 which successively outputs at a sampling frequency of 48.6 MHz the data processed by the data driven engine 14, and a memory access port 28 which produces address information for writing the data packet into the image memory 4 and reading required data from the image memory 4. The data output port 26 may produce the sampling data Y by extracting only required data from the data packets produced by the data driven engine 14. Either form can be used. In the MUSE decoder, it is desirable that the data Y sent from the data output port 26 takes the form of a data packet if this data driven scheme is employed also in a subsequent processing.

The data driven engine 14 includes a junction unit 30 for joining the data packet sent from the input port 10 with the data packet sent from a diverging unit 37 in the data driven engine 14, a buffer memory 32 for absorbing fluctuation of a flow rate of data packets in the engine 14, and a firing control unit 34 provided with a program storage. The firing control unit 34 receives the data packet from the buffer memory 32, updates an instruction code and destination information (node number) required for the fetching of next instruction, and detects the firing. The data driven engine 14 further includes a branching unit 35 which receives the data packets from the firing control unit 31 and distributes to the destinations the data packets in accordance with the contents thereof, a processing unit 36 which receives the data packets from the branching unit 35 and executes the processings in accordance with instructions contained therein, and the branching unit 37 which distributes to the destinations the data packets sent from the processing unit 36.

The junction unit 30 transmits information, which is applied to its input, to an output part when its output is empty. The buffer memory 32 is formed, e.g., of a queue memory, and outputs the data packets in the order of input. The firing control unit 34 provided with the program storage includes a program storage unit PSU storing the data flow program and a firing control unit FCU detecting whether data required for the processing are collected. The structure and operation of the firing control unit provided with the program storage will be described later in detail.

The branching unit 35 transmits the applied data packet to one of the junction unit 41, processing unit 36 and junction unit 43 in accordance with the contents (e.g., destination information, state flag and memory access instruction) of the firing control unit 34 provided with the program storage.

The processing unit 36 executes the operation on the data packet in a fired state in accordance with the operation instruction contained therein. The processing unit 36 writes the result of operation into an operand part of the data packet again.

The branching unit 37 receives the data packet from the processing unit 36, and transmits the applied data packet to one of the junction units 41, 43 and 30 determined by the destination information in accordance with its operation instruction (memory access instruction).

The junction unit 41 joins the data packets sent from the branching units 37 and 35 and transmits the same to the data output port 26. The junction unit 43 joins the data packets sent from the branching units 35 and 37 and transmits the same to the memory access port 28.

The data driven engine 14 has an internal structure pipelined. The data packets in the fired state are supplied therefrom after the operation by the processing unit 36. A data packet, which is in an unfired state because the data packet paired therewith has not arrived, circulates in the data driven engine 14. If the unfired data packets increase in number, amount of the data packets existing in the pipeline stage increases. The buffer memory 32 which is of a first-in first-out type is utilized for adjusting fluctuation (increase and decrease) of the flow rate of data packets in the pipeline.

Figure 4:
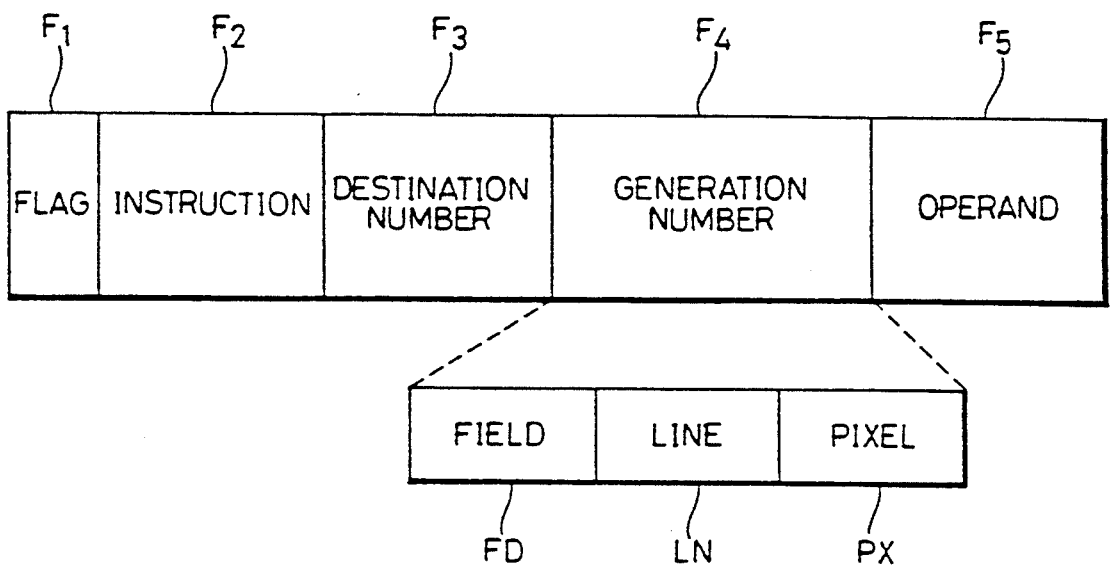
FIG. 4 shows a format of an input/output data packet utilized in the data driven type information processing apparatus shown in FIG. 3.

FIG. 4 shows a format of the data packet sent to and from the data driven engine 14. In FIG. 4, the data packet includes a flag field F1 storing the state flag, an instruction field F2 storing the instruction, a destination number field F3 storing the destination number, a generation number filed F4 storing the generation number, i.e., generation identification number, and an operand field F5 storing the operand (data).

The flag field F1 stores flags such as a flag CTL which indicates that this data packet is to be transmitted to an external control system. The instruction field F2 stores an instruction together with a video memory access instruction identifying flag indicating whether the instruction is an instruction for accessing the image memory or not. The instruction field F2 also stores dyadic/monadic operation instruction identifying flag indicating whether the instruction is a dyadic operation instruction or a monadic operation instruction. The destination number filed F3 includes the node number as well as a two-input node left/right identifying flag indicating whether the data packet is to be applied to the right input arc or the left input arc. The destination number field F3 may include a processor number specifying a processor for operation in a multi-processor system.

The generation number field F4 includes a field FD, line LN and pixel PX which correspond to the bank, row and column in the image memory, respectively.

Figure 5:
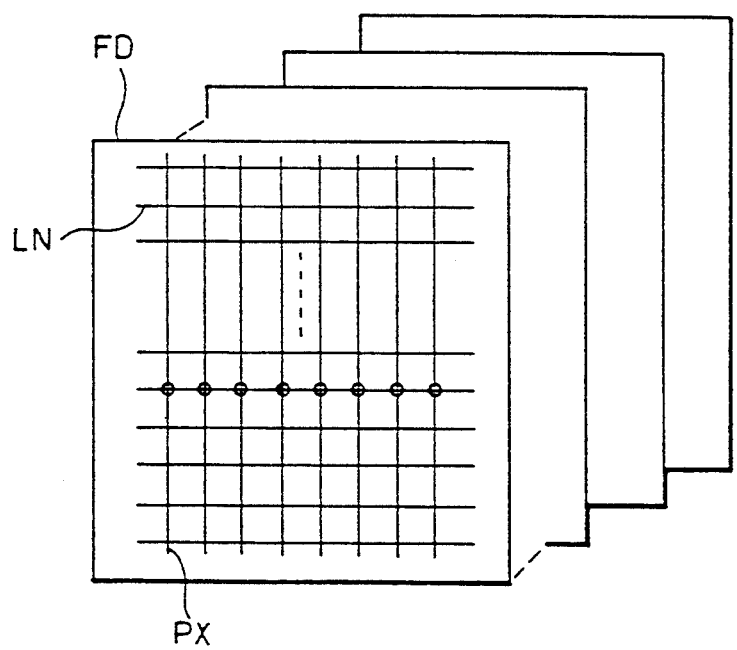
FIG. 5 shows a correlation between memory addresses of an image memory shown in FIG. 1 and generation numbers shown in FIG. 4.

FIG. 5 shows a correlation between the data contained in the generation number field F4 and the memory cell positions in the image memory. The field address FD specifies the field region in the image memory. The region in the image memory designated by the field address FD may be a bank or one plane memory (in the case where one field corresponds to one plane), or may correspond to one field memory. This can be appropriately determined in accordance with the structure of image memory.

The line address LN specifies the row in the field. The pixel address PX specifies the column in the field specified by the field FD. In the structure of image memory shown in FIG. 5, it is assumed that the field address FD corresponds to one field in the MUSE signal. The pixel address PX corresponds to each sample point determined by the sampling pattern. The line address LN corresponds to a scanning line of the MUSE signal. Therefore, the image data (sample data) can be written and read to and from the image memory by accessing the image memory using the data in the generation number field F4 as an address.

The input port 10 shown in FIG. 3 receives the sampling data X and increases the generation number one by one in the order of reception. In the writing operation into the image memory, it produces the data packet in a following manner. The fact that it is the video memory access instruction is indicated by the video memory access instruction identifying flag in the instruction field F2, and the instruction designating the writing of data is written. The node number (e.g., node 1) specifying the node for the data writing is applied to the destination number field F3, and a value of the input data X is stored in the operand field F5. Thereby, the data packet is produced. The data sent from the image memory to the memory access port 22 is in the form of the data packet. In this case, therefore, the memory access port 22 does not produce a new data packet. The format may be adjusted during this process. Then, the structure and operation of the firing control unit 34 provided with the program storage will be described below.

Figure 6:
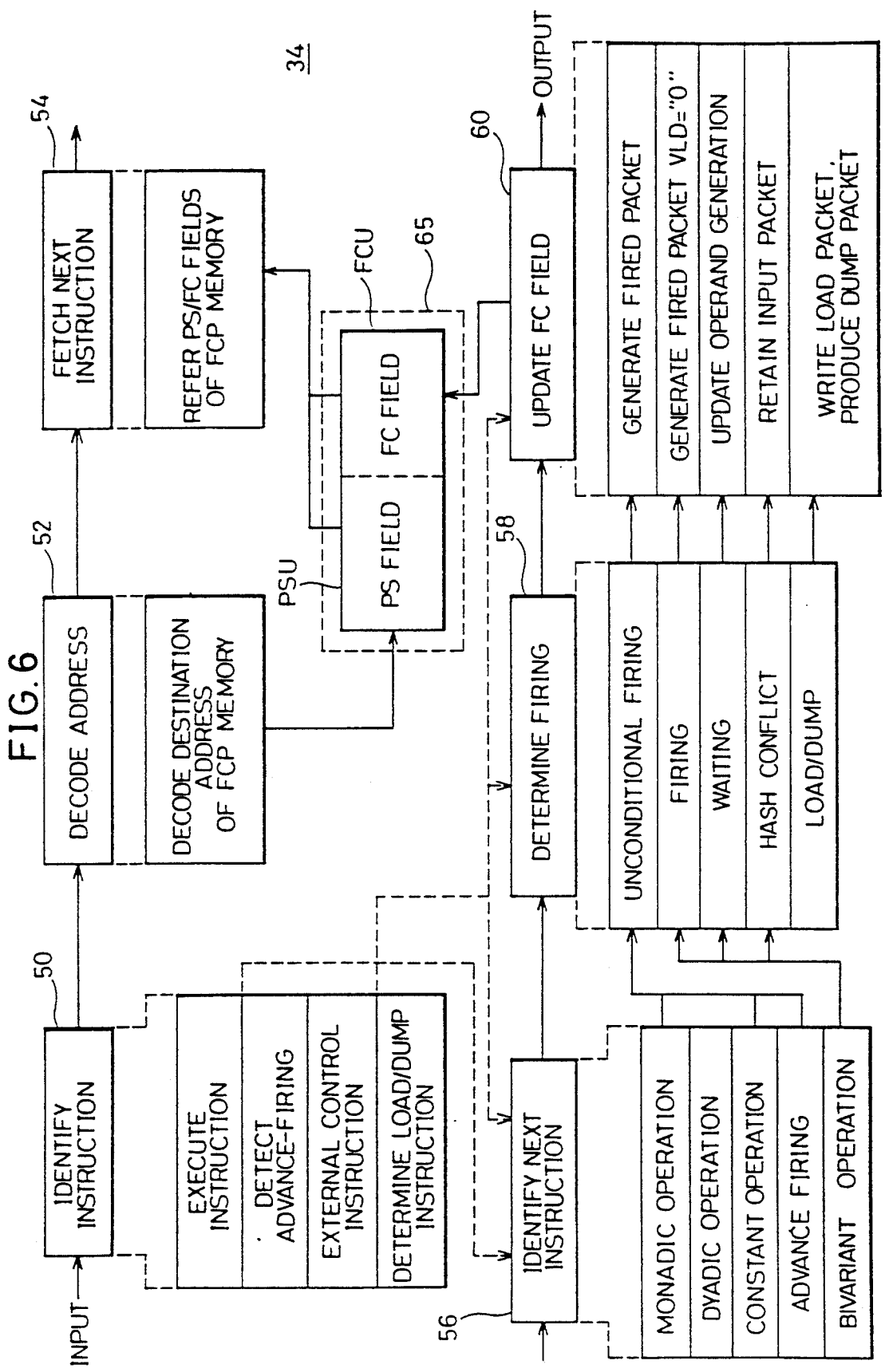
FIG. 6 shows specific structure and operation of a data driven engine shown in FIG. 3.

FIG. 6 shows the structure of the firing control unit provided with the program memory shown in FIG. 3 and the contents of its processing. Referring to FIG. 6, the firing control unit 34 provided with the program storage includes an instruction identifying stage 50 for identifying the instruction contained in the data packet applied thereto, an address decode stage 52 decoding the address in an FCP memory (which will be described later) from the node number and generation number contained in the data packet transmitted from the instruction identifying stage 50, a next instruction fetch stage 54 which accesses an FCP memory 65 for fetching a next instruction, a next instruction identifying stage 56 identifying the next instruction fetched by the next instruction fetch stage 54, a firing determining stage 58 which determines whether the applied packet is fired or not, and an FC field updating stage 60 which updates an FC field (which will be described later) in the FCP memory and outputting the data packet in accordance with the result of determination by the firing determining stage 58.

The FCP memory 65 includes a PS field storing unit PSU which stores a PS field in which the data flow program is stored, and an FC field storing unit FCU which stores the data packet information in a firing waiting state. Formats of the PS field and FC field are shown in FIG. 7.

Figure 7:
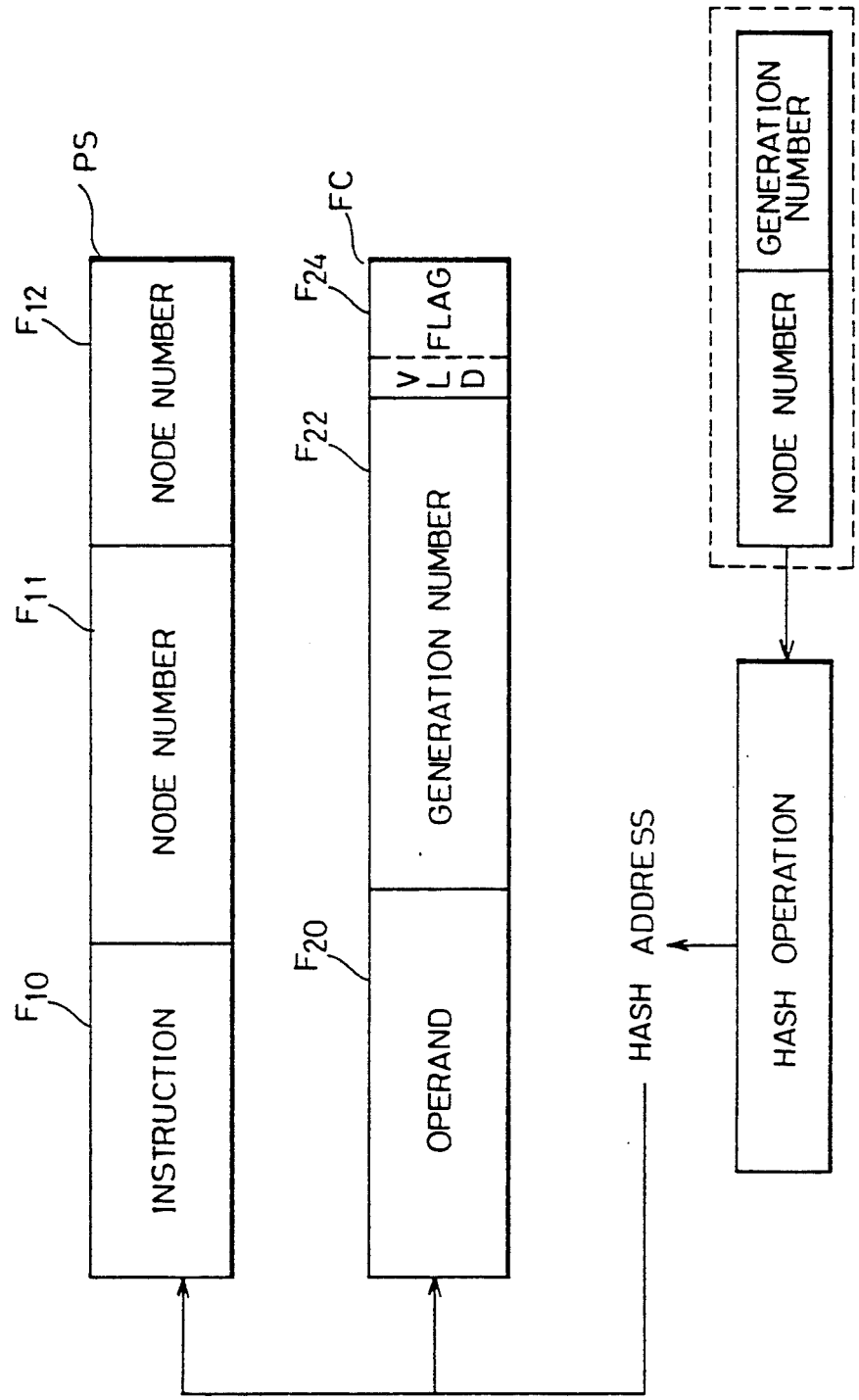
FIG. 7 shows storage contents of an FCP memory shown in FIG. 6 and a method of producing an address.

In FIG. 7, the PS field PS includes an instruction field F10 storing the instruction related to the corresponding node, and node number fields F11 and F12 storing the destination node numbers of up to two nodes to which the result of operation of this instruction is applied.

The FC field FC stores one of the paired data packets which is waiting the other data packet (right or left input data packet in the two-input node) to be fired. The FC field FC includes a waiting operand field F20 storing an operand in the waiting state, a waiting generation number field F22 storing the generation number of the waiting data packet, and a flag field F24 storing a flag indicative of the state of the waiting data packet. The flag field F24 includes a validity flag VLD indicating whether the data written into this FC field is unfired data in the waiting state or not, a constant flag CST indicating that the data stored in the operand field F20 is a constant, and a copy flag CPY indicating that it has two or more destinations. FIG. 7 representatively shows only the validity data flag VLD.

The FCP memory 65 produces the address by performing a Hush operation on the node number and generation number contained in the applied data packet. Hush address, i.e., address produced by the Hush operation is common to both the PS field storing unit PSU and FC field storing unit FCU. The Hush operation is an operation converting one key to another key, and a remainder dividing operation is known as an example. In the case where the Hush operation produces the address for FCP memory 65, there exist a set of data packets designating the same Hush address. Therefore, in the case where the data packets designating the same Hush address exist, the priority is determined in accordance with a predetermined rule, and the data packet having a high priority is written into the FC field and attains a waiting state. The data packet having a low priority is to be circulated through the pipeline in the data driven engine 14, so that it is output, bearing a flag indicative of that fact that it is in the unfired state and is the valid data. The update of data in the FCP memory 65 is generally carried out in a following manner.

For such operands that one of the inputs to two input nodes is constant data, constant data and a constant flag indicative of the fact that the data is constant are written into the operand fields F20 and F24 in the FC field FC of the same address. When the operand paired with this constant data is input, the firing packet is produced unconditionally.

In the case of dyadic operation not having constant data, the content of operand between the left and right operands to the two inputs, which is input earlier than the other, is written into the operand field F20 in the FC field FC, and the validity flag VLD indicative of the fact that this is in the waiting state and is valid data is set. For the operand which is supplied later, reference is made to the contents of two operands on the condition that the validity flag VLD has been set. If the generation numbers are coincident with each other, the firing packets are produced, and the validity flag VLD is reset in order to indicate the fact that the operand in the waiting state has been consumed. If the generation numbers are not coincident with each other, i.e., in the case of Hush conflict, the operands are supplied to the circulation pipeline in accordance with a predetermined priority order with the validity flag of the operand having a lower priority set at 1. The data packets supplied to the circulating pipeline wait generation of empty location in the memory regions in the FC field storage unit FCU. Referring to FIG. 6 again, an operation of the firing control unit provided with the program storage will be described below.

In the instruction identifying stage 50, the instruction code contained in the applied data packet is decoded, whereby it is determined whether the instruction is an execution instruction (i.e., instruction other than load/-dump instructions to the FCP memory) or an external control instruction. In the case of execution instruction, it is determined whether the operand is to access the same address in the FCP memory 65 as the last operand or not. In the case of operand requiring the successive access of the same address in the FCP memory 65, the memory access is not carried out in order to avoid overhead of access to this memory 65. In this case, production of the firing packet formed of the operand pair is executed in FC field updating stage 60 (pre-firing). Thus, in the case of execution instruction, it is determined whether the pre-firing is to be performed or not.

In the address decode stage 52, the Hush operation is executed on the node number and generation number contained in the applied data packet to decode the address in the FCP memory 65 for the purpose of fetch of a next instruction. The result of this decoding is applied to the FCP memory 65.

In the next instruction fetch stage 54, the contents of the corresponding PS field ar read from the PS field storage unit PSU in the FCP memory 65 in accordance with the address decoded in the address decode stage 52, whereby the instruction contained in the contents and destination information (node number) indicating the destination after execution of the instruction are read, and it is determined whether one of the operands is in the waiting state or not, based on the value of validity flag VLD obtained from the corresponding FC field FC.

In the next instruction identifying stage 56, it is determined whether the instruction read in the next instruction fetch stage 54 is a monadic operation instruction or a dyadic operation instruction. This determination is carried out by decoding the instruction code. In the case of dyadic operation, the operation instruction is further determined whether one of the inputs is constant or not. The other operand, i.e., constant operand has been stored in the FC field FC. In this discrimination of dyadic operation, it is further determined whether it is an bivariant operation or not and whether it is a prefired operation or not (which is detected by the instruction identifying stage 50). The result of identification in this next instruction identifying stage 56 is applied to the firing determining stage 58.

The firing determining stage 58 unconditionally determines as the fired state if the next instruction identifying stage 56 identifies the monadic operation instruction, constant operation instruction and pre-fired instruction. In the case of bivariant operation instruction, it is determined whether there is coincidence between the generation number contained in the input data packet and the generation number read from the FC field FC (provided that the validity flag VLD in the FC field is set). In the case of coincidence of the generation numbers, it is determined as the firing, and in the case of noncoincidence, it is determined as the Hush conflict. In the bivariant operation instruction, if the validity flag VLD in the corresponding FC field is in the reset state, the other data packet to be paired is not in the waiting state, so that the one data packet maintains the waiting state until the arrival of the data to be paired.

Further, in the case where it is determined as the load/dump instruction in the instruction identifying stage 50, it is determined as the load/dump condition in the firing determining stage 58 through the next instruction identifying stage 56. The result of determination in the firing determining stage 58 is added as a flag (not shown) to the input data packet to show the state.

The FC field updating stage 60 performs various operations in accordance with the result of determination by the firing determining stage 58. Thus, for the data packet determined as the unconditional firing, the instruction field and destination number field of the input data packet are replaced with the information read from the PS field PS, and also the data read from the FC field (or constant) is added thereto for setting a flag indicative of the firing state before outputting the same.

For the operation instruction which is determined as the bivariant operation instruction and in the firing state, the instruction field and destination number field contained in the input data packet is replaced with the instruction and destination number read from the FC field FC. Also the data contained in the input data packet and the data contained in the FC field FC are linked together and a flag indicative of the firing state is set for outputting the same. In this process, the waiting instruction stored in the FC field FC is consumed, so that the corresponding validity flag VLD is reset.

If it is determined that it is the bivariant operation instruction requiring the waiting, the contents of the FC field FC are replaced with the contents of the input data packet, and the validity flag VLD is set. This achieves the state for waiting the arrival of the data packet to be paired.

In the case that it is determined as the Hush conflict, the input data packet is reserved. In this case, the input data packet is not changed in any way, and a flag (validity flag) indicative of the unfired state is set for outputting the same. The contents of FC field FC in the FCP memory 65 is maintained unchangedly. In connection with this, such a structure may be employed that, if data which has a larger generation number and is in the waiting state is already present in the FC field FC during execution of processing, data having a smaller generation number is written into the FC field FC and is set in the waiting state, and the data packet having a large generation number is set in a reserved state.

In the case of load/dump instruction, and particularly, in the case of load instruction, the data packet to be loaded is written into the PS field. In the case of dump instruction, the contents in the PS field PS are read and are written into the input data packet for producing the dump packet. An image memory access instruction identification (VMA) included in an instruction field F10 (see FIG. 7) designates whether the access to the image memory is to be done or not. In response to the image memory access instruction identifying flag VMA, the branching unit 35 shown in FIG. 3 branches the data to the junction unit 43 and outputs the same to the memory access port 28. In the case where the image memory is to be accessed after the processing, the data packets is transmitted from the branching unit 37 shown in FIG. 3 to the junction unit 43, and is further transmitted to the memory access port 28. The memory access port 28 accesses the image memory using the data contained in the generation number field F22 (or F4; see FIG. 4) as the address information. The image data contained in the image memory has the generation number reserved by the field address FD, line address LN and pixel address PX. Therefore, this generation number may be changed for reading and writing the image data of the intended generation number.

Figure 8A:
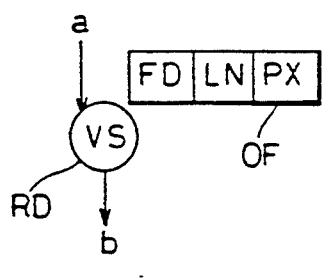
FIGS. 8A-8C exemplify access instructions for accessing an image memory which are used in the data driven type information processing apparatus.
Figure 8B:
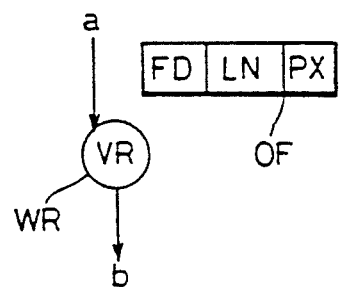
Figure 8C:
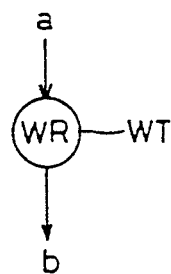

FIGS. 8A-8C show the access instructions for accessing the image memory. A node RD in FIG. 8A corresponds to an instruction by which an offset OF is added to the generation number contained in the image data which is applied to the input arc a, and the data is read by accessing the image memory using the generation number thus offset as an address signal.

An instruction VR of a node WR shown in FIG. 8B is an instruction by which an offset shown in the offset field OF is applied to the generation number contained in the data packet which is applied to the input arc a, and the data is written by accessing the image memory using the generation number thus offset as an address signal.

An instruction WR of a node WT shown in FIG. 8C is an instruction by which a new address signal is produced by doubling the pixel address PX contained in the generation number of the data packet applied to the input arc a, and the data is written in accordance with this new address signal. Then, a specific operation for converting the sampling frequency will be described below with reference to a flow graph of FIG. 10.

Generation numbers are assigned to input data X1, X2, . . . , which are applied to the input port 24 (see FIG. 3) in a time-series manner, in the order of input, and also node numbers are assigned thereto for converting the same into the format of data packet. These data packets are applied to the firing control unit 34 provided with the program storage through the junction unit 30 and buffer memory 32 shown in FIG. 3. The firing control unit 34 provided with the program storage writes the produced data into the image memory in the order of generation number, and performs the following operations shown in FIG. 10.

The generation numbers and node numbers are assigned to the data applied to the input port 24 (see FIG. 3) in the order of input, and then the data in the form of the packet are produced. At a node 202, the input data packets are successively written into positions in the image memory having the pixel addresses PX which are twice their generation numbers. By reason which will be described below with reference to FIG. 9, the pixel address positions which are twice the pixel address of generation numbers are selected for writing the data packets into the image memory a described above.

Figure 9:
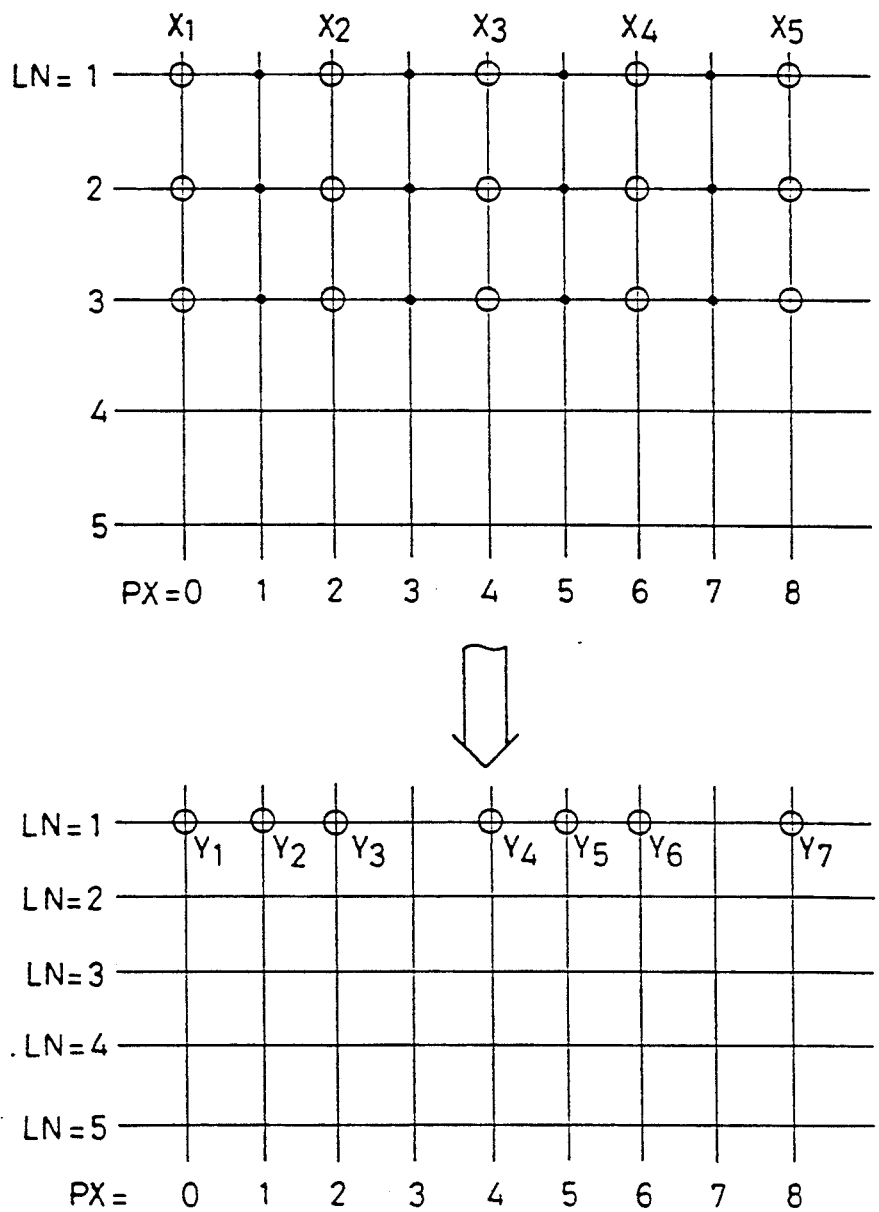
FIG. 9 shows a correlation between storage positions of image data before and after conversion of sampling frequency in the image memory.

FIG. 9 shows an arrangement of sampling data in the image memory. If the data sampled at the sampling frequency of 32.4 MHz is converted into the sampling data at 46.8 MHz, the number of sampling data increases. After the conversion of sampling frequency, the data is written into the image memory again. As shown in FIG. 9, therefore, the input data packets X1, X2, X3, . . . are written into alternate pixel address positions in order to prevent the rewriting with interpolation data prepared before the reading of the data. As shown in the lower arrangement in FIG. 9, image data Y1, Y2, . . . after the conversion of sampling frequency are written into memory positions. In this processing, if interfield interpolation is to be further performed in the MUSE decoder, the image data Y1, Y2, . . . after the conversion of sampling frequency may be written into alternate pixel address positions, which is different from the manner utilizing the lower arrangement in FIG. 9. In either case, the input data packets X1, X2, . . . are written by the operation "WR" into the alternate pixel address positions. The field addresses FD and line addresses LN are not changed.

In parallel with the writing of data packets into the image memory by the node 202, an operation "AGN" is executed at a node 204. In the operation "AGN" at node 204, the right data is fixed data "0", and, upon application of the input data packet, the operation is performed on the fixed constant "0" and the input data packet. This operation "AGN" is an instruction by which copying to the operand field F5 (see FIG. 4) is carried out using the generation number of input data packet as data and then output.

The output of node 204 is applied to a node 206. The node 206 performs an "AND" operation on the operand data contained in the output data packet from the node 204 and the fixed data "1". Thereby, "1" is written into the operand field F5 of the data packet having the odd generation, and data "0" is written into the operand field F5 of the data packet having the even generation. Thereby, the image data of odd and even generations are separated from each other.

The data series is applied to a node 208 after the above separation of the image data of odd and even generations by the node 206. In an operation "EQ" by the node 208, if the data in operand field F5 of data packet is "1", "1" is written thereinto. If not, "0" is written thereinto.

Output data from the node 208 is applied to a node 210. The node 210 is a control gate, and passes left data applied from the node 208 if the right data, i.e., the output data of node 208 is "1". If not, it extinguishes the data applied to its left input arc. Thereby, only data packet corresponding to the image data of odd generation appears from the node 210. The sampling frequency is converted using only the image data of odd generation sent from the node 210. Only the data packet corresponding to the odd generation image data is utilized in order to simultaneously output three data (e.g., Y1, Y2 and Y3) upon receipt of one data packet (e.g., X5). This is equivalent to the output of three converted image data with respect to two input image data, and therefore, the sampling frequency of 32.4 MHz is converted into the sampling frequency of 48.6 MHz which is increased 3/2 times.

The odd generation data packet is applied to nodes 214 and 216. In the node 214, an offset of −2 is applied to the generation number, and data stored in the image memory is read in accordance with the offset address. When the image data X5 is input, the read data is the data packet corresponding to the image data X4. The read data packet has included the instruction, destination number, generation number and operand since the storage thereof. Since the offset of pixel address is −2, the data packet X4 which corresponds to the image data preceded by one generation is read in connection with the input data packet X5. For the sake of simplicity, the data packet is regarded as mere data in the following description. The data X4 read in the node 214 is applied to a node 218. The node 218 applies an offset of −6 to the generation number of this data X4 and reads the data from the image memory. Thereby, the image data X2 preceding by two generations is read. In this description, the offset value indicates an offset value with respect to the input data (X5), for the sake of clarification of a relationship with respect to input data.

In a node 216, the data is read using the generation number of image data X5 as an address. In the data writing operation, the actual write pixel address of image memory is written into an address position, of which number is twice as large as that of the pixel address PX contained in its generation number. Strictly speaking, therefore, the pixel address PX used for reading the image data X5 in the node 216 must correspond to the double of pixel address PX contained in its generation number and must be offset. For the sake of simplicity, it is also assumed that the pixel address of image data X5 is the base address. In order to read the image data at the corresponding actual generation, it is necessary to access the image memory at the address obtained by doubling the pixel address contained in the offset generation number.

The image data X5 read from the node 216 is applied to a node 220. The node 220 applies an offset of −4 to the generation number. The image data X3 preceding the input data X5 by two generations is read. The image data X3 read in the node 220 is applied to a node 222. The node 222 applies an offset of −8 to the generation number of this image data X3 and accesses the image memory. Thereby, the image data X1 which precedes the image data X3 by two generations and thus precedes the input data X5 by four generations is read. Thereby, the five image data X1, X2, X3, X4 and X5 which are required for converting the sampling frequency are read. Then, processings and operations are carried out for interpolation.

The data X5 read by the operation of node 216 is applied to nodes 238 and 258. The node 238 multiplies the image data X5 by the constant $a6$. The node 258 performs multiplication of the image data X5 by the constant $a4$.

The data X4 read in the node 214 is applied also to nodes 224, 240, 260 for multiplication by the constants α5, α3 and α1, respectively.

The data X2 read by the operation of node 218 is applied to nodes 226, 242 and 262 for multiplication by the constants α2, α0 and α2, respectively. The data X2 read by the operation of node 218 is also applied to nodes 228, 246 and 264 for multiplication by the constants α1, α3 and α5, respectively.

The data X1 read by the operation of node 222 is applied to nodes 230 and 248 for multiplication by the constants α4 and α6.

The operation results of the nodes 224 and 226 are added to each other in a node 232. The operation results of the nodes 238 and 232 are added to each other in a node 234. The operation results of the nodes 230 and 234 are added to each other in a node 236. Thereby, the data packet corresponding to the image data Y1 is produced.

The operation results of the nodes 238 and 240 are applied to a node 250 and are added to each other therein. The operation results of the nodes 242 and 250 are added to each other in a node 252. The operation results of the nodes 246 and 252 are added to each other in a node 254. The operation results of the nodes 248 and 254 are added to each other in a node 256. Thereby, the data packet corresponding to the image data Y2 is produced.

The operation results of the nodes 258 and 260 are added to each other in a node 266. The operation results of the nodes 262 and 266 are added to each other in a node 268. The operation results of the nodes 264 and 268 are added to each other in a node 270. Thereby, the image data packet corresponding to the image data Y3 is produced in the node 270.

In the above process, each multiplying operation can be executed in a parallel manner. Only adding processings are executed after definition of operations results of upstream nodes. Therefore, the image data Y1, Y2 and Y3 are produced substantially in parallel in this process. In the data driven type information processing apparatus, the firing and operation are executed upon collection of data required for the operation in each node. Therefore, parallel processings can be easily and surely performed at a high speed without performing timing control of input signals which is required in general digital circuits. The process for the sampling frequency conversion shown in FIG. 10 can be expressed by the following formula (1).

$$\begin{pmatrix} Y1 \\ Y2 \\ Y3 \end{pmatrix} = \begin{pmatrix} \alpha4 & \alpha1 & \alpha2 & \alpha5 & 0 \\ \alpha6 & \alpha3 & \alpha0 & \alpha3 & \alpha6 \\ 0 & \alpha5 & \alpha2 & \alpha1 & \alpha4 \end{pmatrix} \begin{pmatrix} x1 \\ X2 \\ X3 \\ X4 \\ X5 \end{pmatrix} \quad (1)$$

Specific values of the coefficients are as follows.

$\alpha0 = 4.38672 \quad \alpha1 = 3.39524$
$\alpha2 = 1.24888 \quad \alpha3 = -0.26716$
$\alpha4 = -0.50764 \quad \alpha5 = -0.13648$
$\alpha6 = 0.07380$ When data X7 is applied thereafter, data packets corresponding to the data Y4, Y5 and Y6 are produced using the data X7−X3. These data packets Y1, Y2 and Y3 are output through the output port 12 at the sampling frequency of 48.6 MHz. Alternatively, they may be written into the image memory through the memory access port 28. Whether it is output through the data output port 26 or written through the memory access port 28 into the image data depends on contents of a process to be performed subsequently. A general manner of this conversion of sampling frequency is expressed in the following formula (2).

$$\begin{pmatrix} Y3j + 1 \\ Y3j + 2 \\ Y3j + 3 \end{pmatrix} = \begin{pmatrix} \alpha4 & \alpha1 & \alpha2 & \alpha5 & 0 \\ \alpha6 & \alpha3 & \alpha0 & \alpha3 & \alpha6 \\ 0 & \alpha5 & \alpha2 & \alpha1 & \alpha4 \end{pmatrix} \begin{pmatrix} X2j + 1 \\ X2j + 2 \\ X2j + 3 \\ X2j + 4 \\ X2j + 5 \end{pmatrix} \quad (2)$$

$(j = 0, 1, \ldots)$

Figure 18:
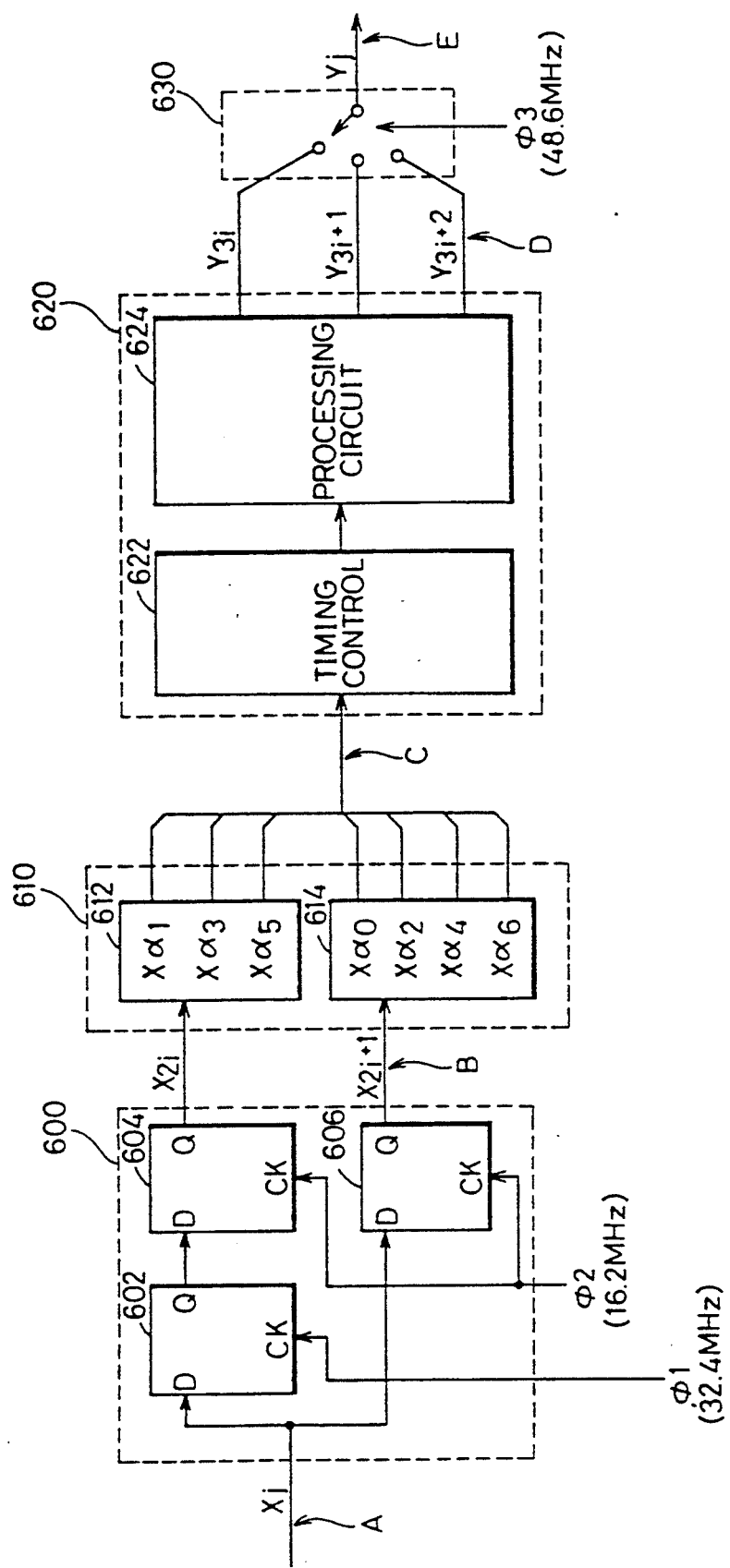
FIG. 18 shows a structure of a sampling frequency converting apparatus in the prior art.
Figure 19A:
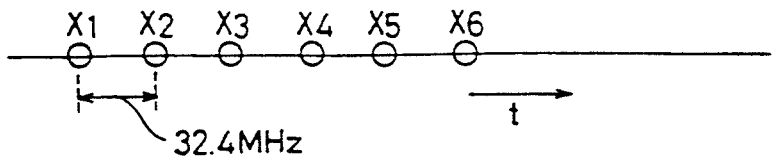
FIGS. 19A-19E show output sampling patterns of respective circuits in the sampling frequency converting apparatus shown in FIG. 18.
Figure 19B:
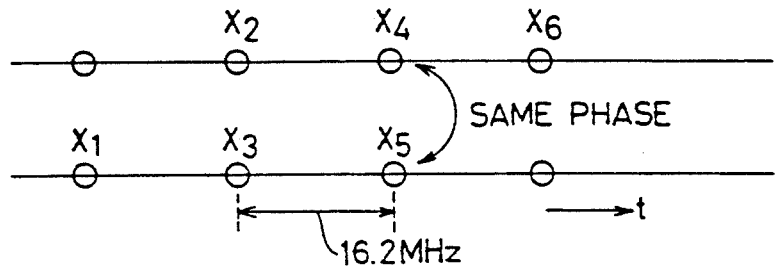
Figure 19C:
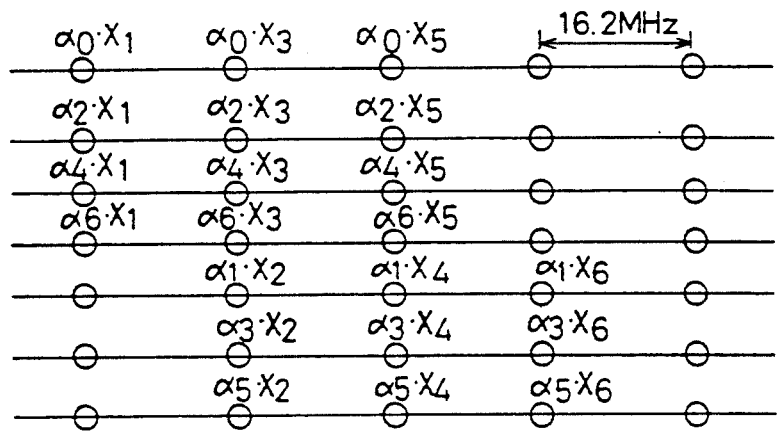
Figure 19D:
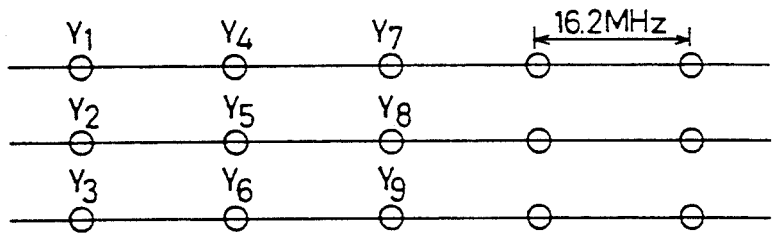
Figure 19E:
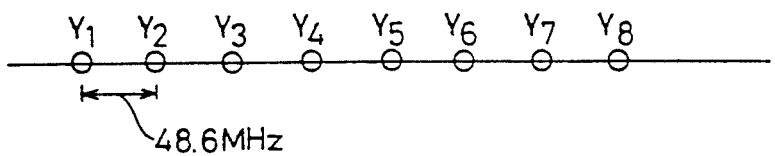

Therefore, the sampling frequency is increased by execution of the interpolation processing, which is similar to that by the sampling frequency converting circuit formed of digital circuits already described with reference to FIG. 18.

Figure 10:
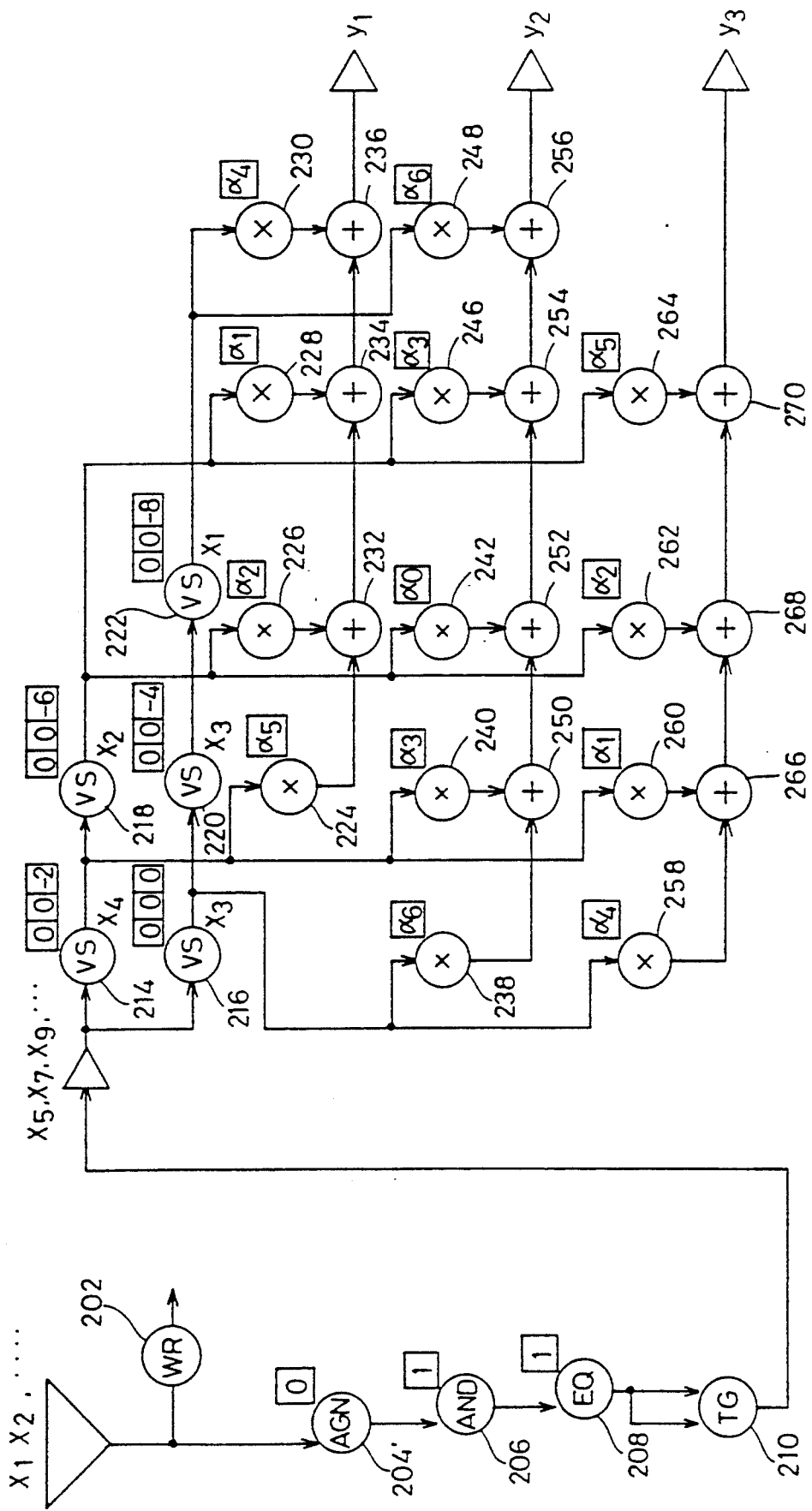
FIG. 10 shows a data flow graph used for the sampling frequency conversion in the data driven engine shown in FIG. 3.
Figure 11A:
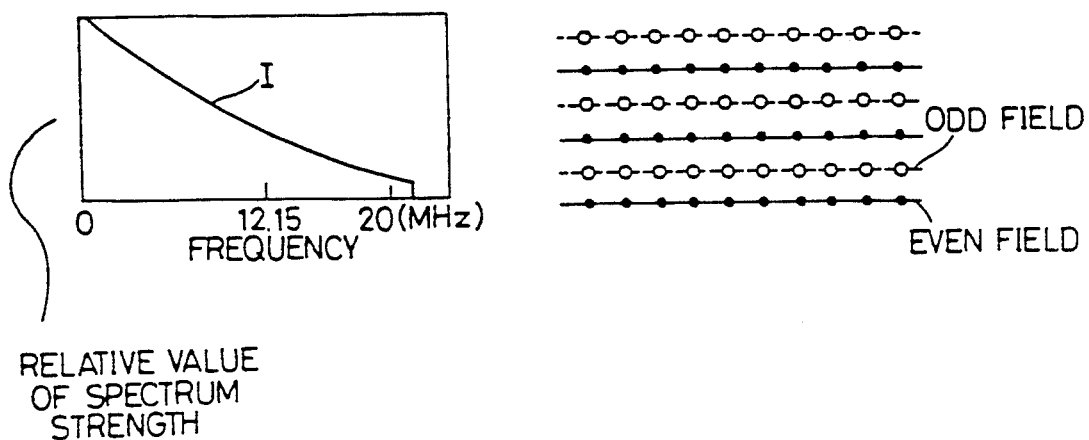
FIGS. 11A-11E illustrate a method of producing an MUSE signal.
Figure 11B:
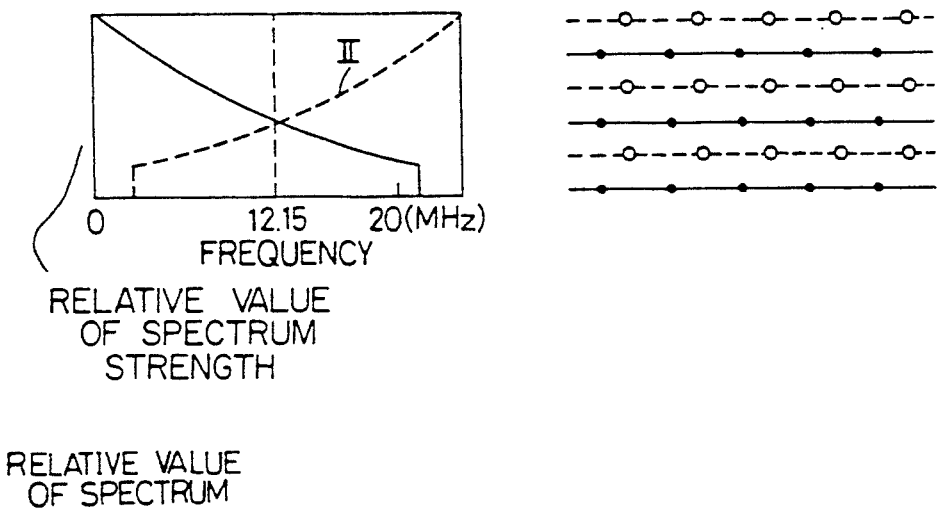
Figure 11C:
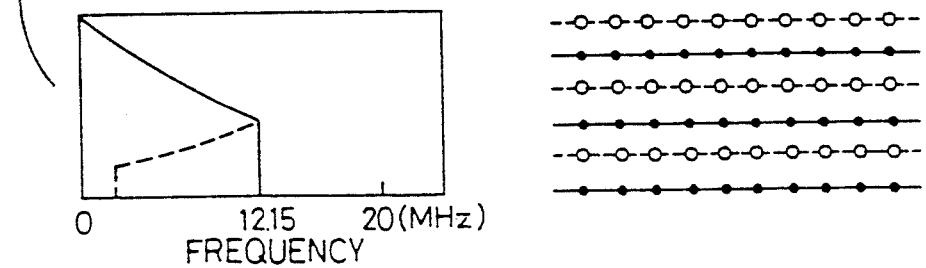
Figure 11D:
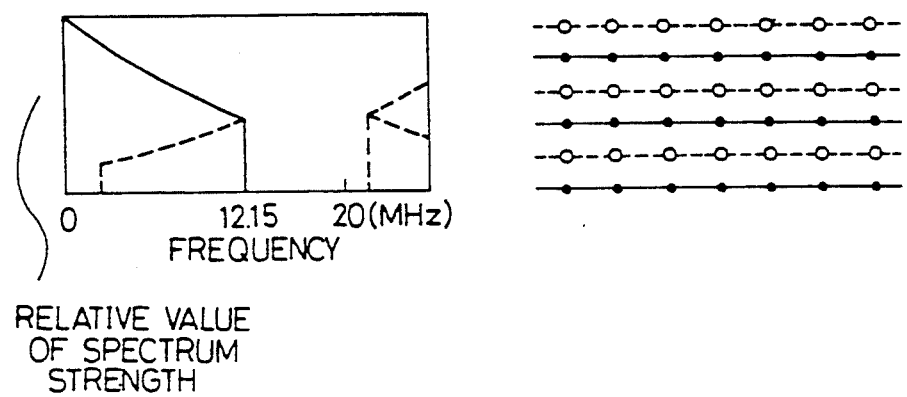
Figure 11E:
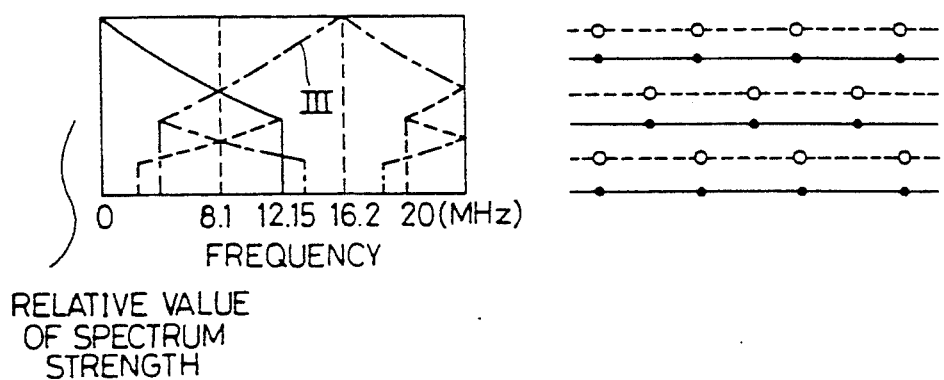
Figure 12:
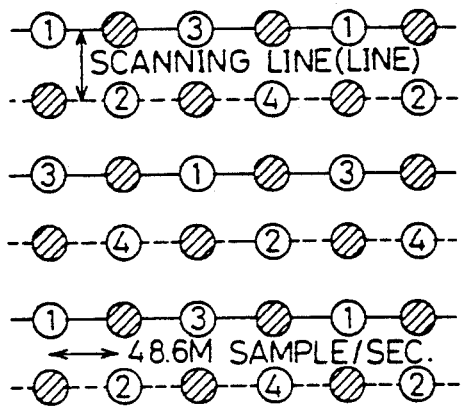
FIG. 12 shows a sampling pattern of a band-compressed MUSE signal.
Figure 13:
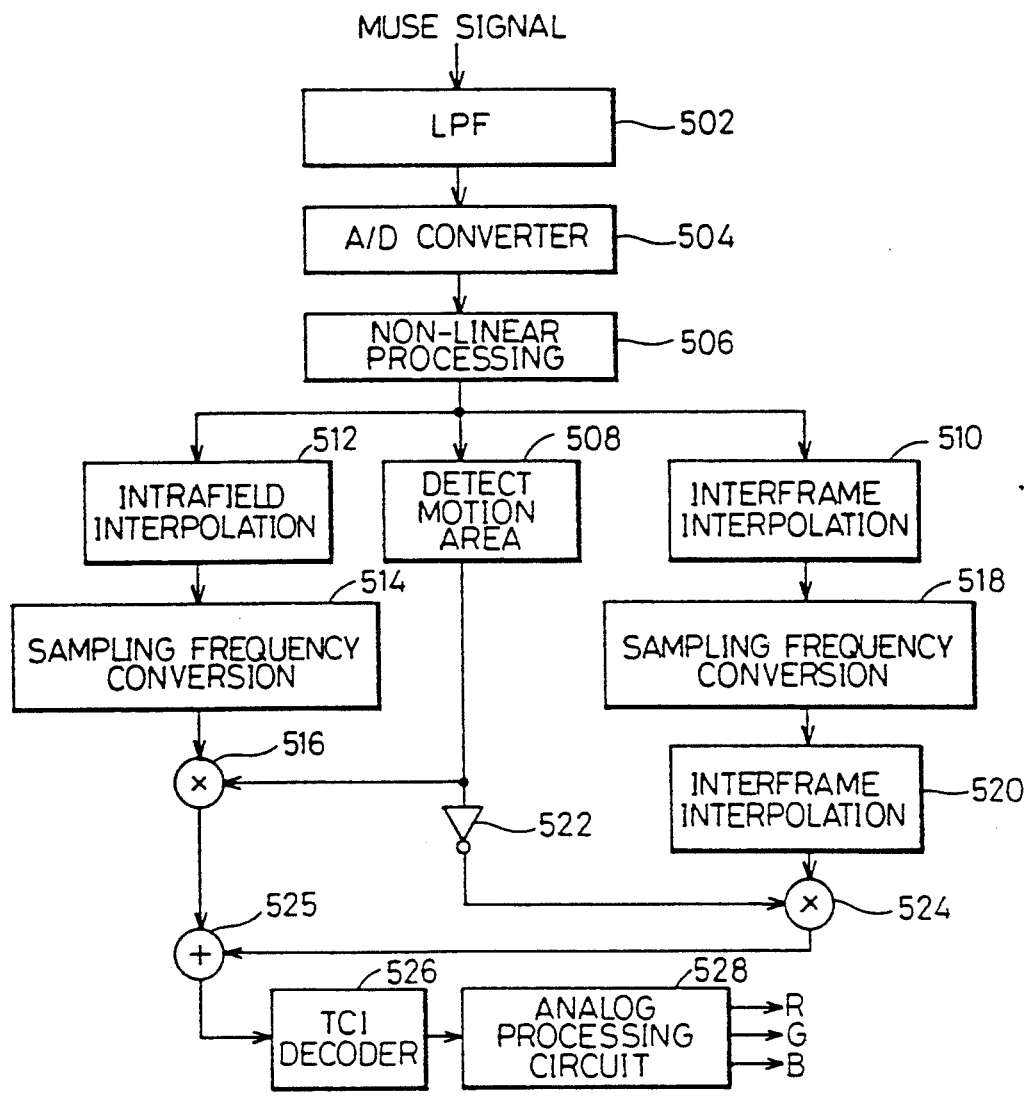
FIG. 13 shows a schematic structure of an MUSE decoder in the prior art.
Figure 14:
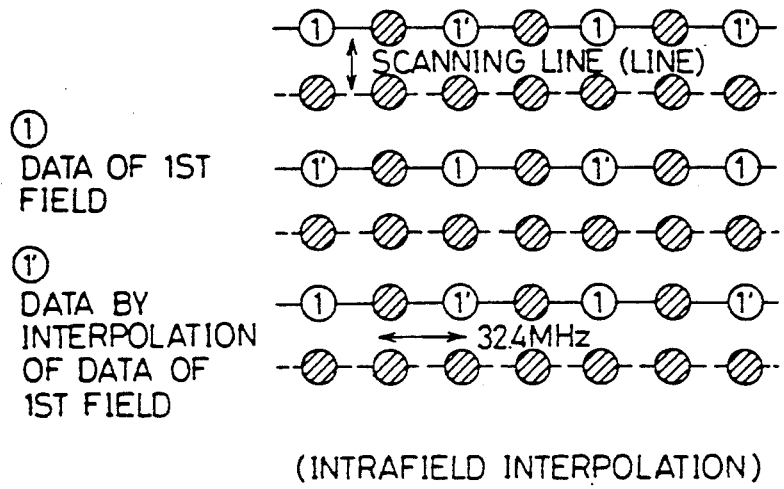
FIG. 14 shows an arrangement of sampling data after intrafield interpolation in the MUSE decoder shown in FIG. 13.
Figure 15:
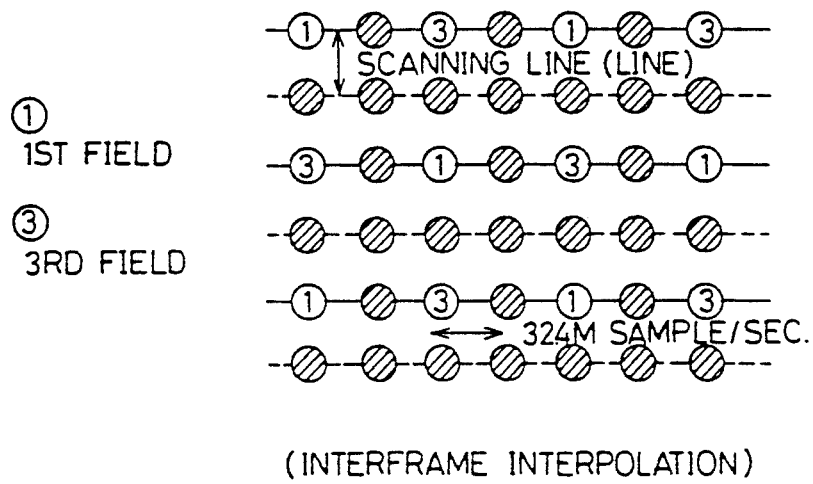
FIG. 15 shows a sampling pattern after interframe interpolating operation in the MUSE decoder shown in FIG. 13.
Figure 16:
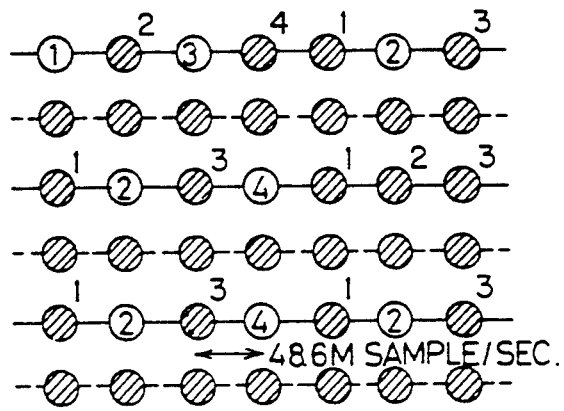
FIG. 16 shows a sampling patter after interfield interpolation in the MUSE decoder shown in FIG. 13.
Figure 17:
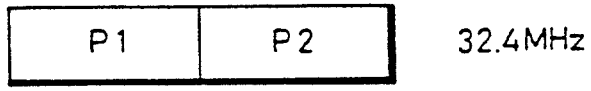
FIG. 17 exemplifies a correlation of image data after conversion of a sampling frequency.
Figure 17:
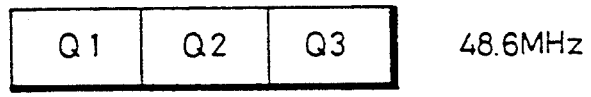

In the above structure, the change of the specification of frequency conversion requires only the change of the data flow graph shown in FIG. 10, and does not require any change of the structure of apparatus.

It has been described that the data flow graph shown in FIG. 10 is executed in one data driven engine. Since the data driven type information processing apparatus has a high parallel processing performance as its essential feature, it can produce at a high speed the data packets corresponding to the image data Y1, Y2 and Y3. Separate data driven engines may be utilized for the respective output image data, in which case outputs of the three processing apparatus are selectively passes. The multiprocessor system employs a structure in which the node numbers contain information specifying processors.

In the embodiments described above, the conversion of sampling frequency is performed on the MUSE signal. The signal of which sampling frequency is converted is not restricted to the MUSE signal and may be another digital signals. The invention can be applied to the arts in which a sampling frequency is converted by the interpolating processing.

According to the invention, as described above, the conversion of sampling frequency of digital signal is performed according to the processings of the data driven type, so that the sampling frequency converting apparatus having intended characteristics can be easily and quickly obtained without requiring complicated timing control, and the sampling frequency converting apparatus can have flexibility by which change of specification of the frequency conversion can be accommodated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for converting a sampling frequency of digital signals sampled at a first sampling frequency into a second sampling frequency comprising:

input data packet producing means for receiving said digital signals sampled at said first sampling frequency and assigning generation numbers and node numbers indicative of predetermined destinations to the received digital signals in an order of reception for producing input data packets;

writing means for writing the produced input data packets into a memory means using said generation numbers related thereto as address signals;

reading means for reading, according to said produced data packets, from said memory means a predetermined set of said input data packets in accordance with instructions corresponding to the related node numbers; and processing means for executing instructions allocated to said node numbers contained in said data packets read by said reading means in accordance with said node numbers and performing an operation on the read data packets, said processing means producing a plurality of data packets as a result of said operation such that a ratio between an input rate of said input data packets and a rate of the corresponding data packets produced by said processing means is equal to a ratio between said first sampling frequency and said second sampling frequency.

2. The apparatus according to claim 1, wherein said memory means includes storage elements arranged in a matrix form; and said writing means includes means for writing said data packets produced by said input data packet producing means into said storage elements at alternate columns.

3. The apparatus according to claim 1, further comprising pre-processing means for extracting the data packet having a predetermined generation number from said data packets produced by said input data packet producing means for application to said reading means.

4. The apparatus according to claim 3, wherein said pre-processing means includes means for extracting a data packet having a generation number of an odd number.

5. The apparatus according to claim 1, wherein said reading means includes means for reading a predetermined number of data packets having the generation numbers which continuously precede the generation number of the applied data packet.

6. The apparatus according to claim 1, wherein said reading means includes means for reading the data packets $x(2j+1)$ to $X(2j+5)$ having the generation numbers of $2j+1$ to $2j+5$; and said processing means executes the following operation:

$$\begin{pmatrix} Y3j+1 \\ Y3j+2 \\ Y3j+3 \end{pmatrix} = \begin{pmatrix} \alpha 4 & \alpha 1 & \alpha 2 & \alpha 5 & 0 \\ \alpha 6 & \alpha 3 & \alpha 0 & \alpha 3 & \alpha 6 \\ 0 & \alpha 5 & \alpha 2 & \alpha 1 & \alpha 4 \end{pmatrix} \begin{pmatrix} X2j+1 \\ X2j+2 \\ X2j+3 \\ X2j+4 \\ X2j+5 \end{pmatrix} \quad (2)$$

where $\alpha 1, \ldots \alpha 6$ : predetermined constants j: integer $0, 1, 2 \ldots$ $Y(3j+1), Y(3j+2), Y(3j+3)$: resultant data packets.

7. The apparatus according to claim 1, wherein said ratio between said first sampling frequency and said second sampling frequency is 2:3.

8. The apparatus according to claim 1, wherein said writing means, said reading means and said processing means are implemented by a data driven engine which executes processing according to a data driven method.

9. The apparatus according to claim 1, wherein said digital signal is a digital image signal subsampled at a predetermined sampling frequency.

10. The apparatus according to claim 1, wherein said digital signal is a MUSE signal.

11. A method of converting a sampling frequency of a digital signal sampled at a first sampling frequency into a second sampling frequency, comprising the steps of:

successively receiving digital signals sampled at said first sampling frequency, assigning generation numbers to the received digital signals in an order of reception, assigning node numbers indicative of destination numbers to the received digital signals, and thereby producing data packets, instructions to be executed being allocated in advance to said node numbers;

writing the produced data packets into a memory means using the related generation numbers as addresses;

reading a predetermined number of data packets, which have the continuous generation numbers, from said memory means in accordance with a data flow processing in response to input of said data packets; and producing a plurality of data packets by executing instructions allocated to the node numbers contained in said predetermined number of read data packets in accordance with these node numbers and by performing a predetermined operation on said predetermined number of data packets, a ratio between an input rate of said input data packet and a production rate of said plurality of produced data packets being equal to a ratio between said first sampling frequency and said second sampling frequency.

12. The method according to claim 11 further comprising the step of:

extracting the data packet having a predetermined generation number from said data packets produced from the input digital signals, before said step of reading.

13. The method according to claim 11 further comprising the step of:

extracting the data packet having a generation number of an odd number from said produced data packets, before said step of reading.

14. The method according to claim 11, wherein said step of performing said predetermined operation includes the step of executing a parallel processing by a processing of a data flow type.

* * * * *

UNITED STATES PATENT AND TRADEMARK OFFICE
CERTIFICATE OF CORRECTION

PATENT NO. : 5,327,125
DATED : July 5, 1994
INVENTOR(S) : Toshihiro IWASE
Hiroshi KANEKURA It is certified that error appears in the above-indentified patent and that said Letters Patent is hereby corrected as shown below:

Column 1, line 25, change "subsampling subencoding" to
--sampling encoding--.
Column 2, line 18, change "one frame" to --a picture--.
Column 2, line 27, delete "(one frame)".
Column 2, line 48, after "four" insert --successive--.
Column 2, lines 58-59, change "of 8.2 MHz, and passes the" to --allowing passage of--.
Column 2, line 59, change "signal of a band" to --signals having a bandwidth--.
Column 3, line 54, after "TCI" insert --(Time Compressed Integration)--.
Column 4, line 51, change "one of the output" to --both of the outputs--.
Column 4, line 53, change "is selected" to --are mixed together--.
Column 7, line 20, correct "simple type" to --simplified--.
Column 8, lines 18-19, change "are allocated to the" to --are described by data flow programs,--.
Column 8, line 19, delete "respective nodes,".

UNITED STATES PATENT AND TRADEMARK OFFICE
CERTIFICATE OF CORRECTION

PATENT NO. : 5,327,125
DATED : July 5, 1994
INVENTOR(S) : Toshihiro IWASE
Hiroshi KANEKURA It is certified that error appears in the above-indentified patent and that said Letters Patent is hereby corrected as shown below:

Column 8, lines 21-22, change "the operations allocated to the" to --the data flow programs.--.
Column 8, lines 22, delete "nodes.".
Column 9, line 25, change "apparatus" to --apparatus 1--.
Column 10, line 11, change "data drive" (first and second occurrences) to --data-driven--.
Column 10, delete line 43 in its entirety.
Column 10, delete lines 44 and 45 in their entirety.
Column 10, line 46, delete "can be individually accessed.".
Column 11, line 11, delete "34".
Column 11, line 12, change "storage." to --storage 34.--, and after "unit" insert --provided with a program storage--.
Column 11, line 30, delete "34" and change "the" to --a--.
Column 11, line 31, change "storage includes" to --storage 34 includes--.
Column 11, line 41, delete "34".

UNITED STATES PATENT AND TRADEMARK OFFICE
CERTIFICATE OF CORRECTION

PATENT NO.   : 5,327,125
DATED        : July 5, 1994
INVENTOR(S)  : Toshihiro IWASE
               Hiroshi KANEKURA It is certified that error appears in the above-indentified patent and that said Letters Patent is hereby corrected as shown below:

Column 11, line 42, change "the" to --a-- and after "storage" insert --34--.

Column 12, line 18, change "dyadic/monadic operation" to --two/one input--.

Column 12, line 19, delete "dyadic operation".

Column 12, line 20, change "instruction or a monadic operation instruction." to --two input instruction such as addition or a one input instruction such as an absolute.--.

Column 13, line 53, change "Hush" to --Hash--.

Column 13, line 55, change "Hush" (both occurrences) to --Hash--.

Column 13, line 57, change "Hush" to --Hash--.

Column 13, line 60, change "Hush" to --Hash--.

Column 13, line 62, change "Hush" to --Hash--.

UNITED STATES PATENT AND TRADEMARK OFFICE
CERTIFICATE OF CORRECTION

PATENT NO. : 5,327,125
DATED : July 5, 1994
INVENTOR(S) : Toshihiro IWASE
Hiroshi KANEKURA It is certified that error appears in the above-indentified patent and that said Letters Patent is hereby corrected as shown below:

```
    Column 13, line 64, change "Hush" to --
Hash--.
    Column 14, line 26, change "Hush" to --
Hash--.
    Column   14,   lines   26-27,   change
"circulation" to --circular--.
    Column 14, line 30, change "circulating"
to --circular--.

Column 14, line 52, change "Hush" to --
Hash--.
    Column 15, line 27, change "Hush" to --
Hash--.
    Column 15, line 67, change "Hush" to --
Hash--.
    Column 20, line 29, change "It" to --
Although it--.
```

UNITED STATES PATENT AND TRADEMARK OFFICE
CERTIFICATE OF CORRECTION

PATENT NO. : 5,327,125

DATED : July 5, 1994

INVENTOR(S) : Toshihiro IWASE
Hiroshi KANEKURA

It is certified that error appears in the above-indentified patent and that said Letters Patent is hereby corrected as shown below:

Column 20, line 30, change "in" to --using-- and after "engine" insert --(single processor configuration), it can also be executed in a multiprocessor configuration as described below.--.

Signed and Sealed this

Twenty-third Day of May, 1995

Attest:

BRUCE LEHMAN

Attesting Officer

Commissioner of Patents and Trademarks